US007522810B2

(12) United States Patent
Ogura et al.

(10) Patent No.: US 7,522,810 B2
(45) Date of Patent: Apr. 21, 2009

(54) SCANNING HEAD AND PRINTER

(75) Inventors: Jun Ogura, Fussa (JP); Yasuhiro Daiku, Iruma (JP); Tomoyuki Shirasaki, Higashiyamato (JP); Tetsuya Kusuno, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 277 days.

(21) Appl. No.: 11/350,985

(22) Filed: Feb. 9, 2006

(65) Prior Publication Data

US 2006/0181603 A1 Aug. 17, 2006

(30) Foreign Application Priority Data

| | | | |
|---|---|---|---|
| Feb. 14, 2005 | (JP) | ............................ | 2005-036219 |
| Nov. 18, 2005 | (JP) | ............................ | 2005-334583 |
| Jan. 27, 2006 | (JP) | ............................ | 2006-019193 |

(51) Int. Cl.
*G02B 6/10* (2006.01)

(52) U.S. Cl. ........................ 385/146; 385/147; 385/129

(58) Field of Classification Search ......... 385/129–133, 385/146, 147

See application file for complete search history.

(56) References Cited

U.S. PATENT DOCUMENTS

2001/0046365 A1* 11/2001 Bohle et al. ................. 385/146

FOREIGN PATENT DOCUMENTS

| | | | |
|---|---|---|---|
| JP | 06-130878 | A | 5/1994 |
| JP | 9-226172 | A | 9/1997 |
| JP | 2002-289019 | A | 10/2002 |
| WO | WO 2004/039595 | A1 | 5/2004 |

OTHER PUBLICATIONS

Chinese Office Action (and English translation thereof) dated Jul. 4, 2008, issued in a counterpart Chinese Application.

* cited by examiner

*Primary Examiner*—Kevin S Wood
(74) *Attorney, Agent, or Firm*—Frishauf, Holtz, Goodman & Chick, P.C.

(57) ABSTRACT

A scanning head includes a surface emitting part array panel which has an array of surface emitting parts to emit light A plurality of light guide parts are respectively opposite to the surface emitting parts. Each of light guide parts has an entrance plane to receive the light from the surface emitting part, a reflection plane to reflect the light from the entrance plane, and an exit plane to emit the light from the reflection plane.

20 Claims, 25 Drawing Sheets

SCANNING HEAD AND PRINTER

CROSS-REFERENCE TO RELATED APPLICATIONS

This application is based upon and claims the benefit of priority from prior Japanese Patent Applications No. 2005-036219, filed Feb. 14, 2005; No. 2005-334583, filed Nov. 18, 2005; and No. 2006-019193, filed Jan. 27, 2006, the entire contents of all of which are incorporated herein by reference.

BACKGROUND OF THE INVENTION

1. Field of the Invention

The present invention relates to a scanning head having a structure suitable for a printer, scanner, copier or other image input and/or output apparatus, and a printer having such a scanning head.

2. Description of the Related Art

Page printers have been vigorously developed in recent years, because they can print on ordinary paper as well as specific paper. A page printer uses a laser scanning head composed of a laser diode and a polygon lens. In a laser scanning head, a laser emitting point is moved by a polygon lens, and printing at high-speed is difficult.

For high-speed printing, an LED scanning head using two or more LEDs has been developed. Two or more LEDs are aligned in an LED scanning head. These LEDs simultaneously emit light of different intensity, thereby scanning a photoconductor. As high picture quality is demanded, very high accuracy is demanded for packaging of LEDS with high density. This causes a problem of increased number of components.

To solve the above problems, Jpn. Pat. Appln. KOKAI Publication No. 9-226172 proposed a scanning head using an organic electroluminescent element as an LED.

However, at present, an organic electroluminescent element has a problem in luminous intensity and life. Namely, a light-emitting element requires sufficient amount of light to expose a photoconductor, and if the luminous intensity per dot of an organic electroluminescent element is weak, the exposing time per a dot must be set long. To set the exposing time long, the printing speed must be delayed. Conversely, if the luminous intensity per a dot of an organic electroluminescent element is increased, the exposing time per dot is reduced and the printing time is reduced, but the life of an organic electroluminescent element is reduced.

The luminous flux of an LED such as an organic electroluminescent element spreads from a light-emitting point, and it is preferable to provide an optical system between LED and photoconductor, which gives directivity to incident light from a dot of an LED to be emitted only to a specified part of a photoconductor. However, the efficiency of using such an optical system depends on an angle of taking in light (angular aperture), and the efficiency of using light is not high in a source like an LED which causes a light diffusion.

BRIEF SUMMARY OF THE INVENTION

It is an object of the present invention to provide a scanning head and a printer, which can efficiently emit light without increasing the luminous intensity of a surface emitting part.

According to a first aspect of the invention, there is provided a scanning head comprising:

a surface emitting part array panel which has an array of surface emitting parts to emit light; and a plurality of light guide parts which are respectively opposite to the surface emitting parts, each of light guide parts having an entrance plane to receive the light from the surface emitting part, a reflection plane to reflect the light from the entrance plane, and an exit plane to emit the light from the reflection plane.

According to a second aspect of the invention, there is provided a printer comprising:

a surface emitting part array panel which has an array of surface emitting parts to emit light; and a plurality of light guide parts each of which is opposite to the surface emitting part, and has an entrance plane to receive the light from the surface emitting part, a reflection plane to reflect the light from the entrance plane, and an exit plane to emit the light from the reflection plane.

In the above scanning head and printer, the light emitted from the surface emitting part enters the entrance plane of the light guide part, the entered light is reflected on the reflection plane, and the reflected light is emitted from the exit plane. As the exit plane of the light guide part is a plane different from the entrance plane, and the exit plane is not increased even if the entrance plane is increased. If the entrance plane is increased and the light-emitting area of the surface emitting part is increased, the intensity per unit area of the exit plane is increased without increasing the light emission intensity per a unit area of the surface emitting part. Therefore, the exposing time can be reduced. Further, since the light emission intensity per unit area of the surface emitting part is not increased, the life of the surface emitting part can be made long.

According to a third aspect of the invention, there is provided a scanning head comprising:

a surface emitting part array panel which has an array of surface emitting parts to emit a light beam; and a plurality of light guide parts each of which has an entrance plane opposite to the surface emitting part, a first opposite reflection plane opposite to the entrance plane in the state inclined to the entrance plane, a second opposite reflection plane provided along the first opposite reflection plane and inclined to the entrance plane to have an included angle larger than an included angle between the entrance plane and first opposite reflection plane, and an exit plane to emit the light from the surface emitting part.

According to a fourth aspect of the invention, there is provided a printer comprising:

a surface emitting part array panel which has an array of surface emitting parts to emit light; and a plurality of light guide parts each of which has an entrance plane opposite to the surface emitting part, a first opposite reflection plane opposite to the entrance plane in the state inclined to the entrance plane, a second opposite reflection plane provided along the first opposite reflection plane and inclined to the entrance plane to have an included angle larger than an included angle between the entrance plane and first opposite reflection plane, and an exit plane to emit the light from the surface emitting part.

In the above scanning head and printer, the light emitted from the surface emitting part enters the entrance plane of the light guide part, the entered light is reflected on the first opposite reflection plane and second opposite reflection plane, and the reflected light is emitted from the exit plane. The second opposite reflection plane is provided in the inclined state to have an included angle larger than the included angle between the first opposite reflection plane and entrance plane, by transmitting light in the light guide part, and the directivity of light in the direction vertical to the exit plane can be improved.

According to the present invention, the intensity per unit area of the exit plane can be increased, without increasing the light emission intensity per unit area of the surface emitting part. As a result, the life of the surface emitting part can be made long.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

FIGS. 17A and 17B are views for explaining the relation of an included angle γ between an entrance plane and an opposite reflection plane, to an emission intensity/luminous intensity, wherein FIG. 17A shows light guide parts of this invention and reference example, and FIG. 17B is a graph showing the result of the relation of an angle θ to an emission intensity/luminous intensity;

DETAILED DESCRIPTION OF THE INVENTION

Embodiments of the present invention will be explained hereinafter with reference to the accompanying drawings. In the embodiments, technically preferably various limitations are given to embody the invention, but the scope of the invention is not to be limited to the embodiments and drawings.

Figure 1:
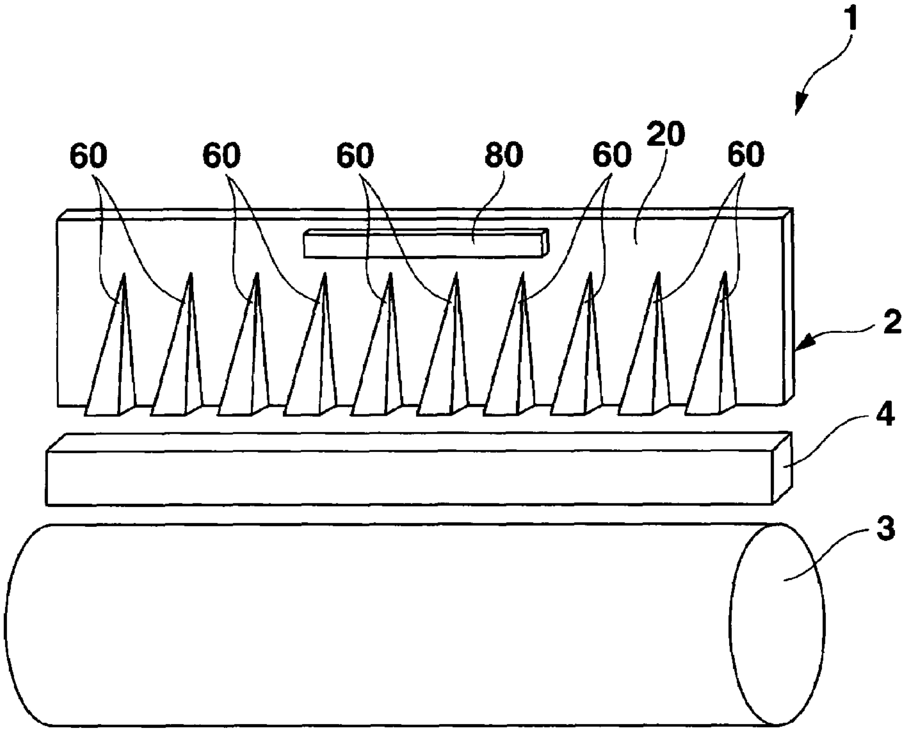
FIG. 1 is a perspective view of an image output apparatus.

FIG. 1 is a perspective view of an image output apparatus 1. As shown in FIG. 1, in the image output apparatus 1, a scanning head 2 is placed with the light-emitting part opposed to a generating line of a photoconductive drum 3 and the longish side mode parallel to the rotary shaft of the roller-shaped photoconductive drum 3. A SELFOC lens array 4 is provided between the light-emitting part of the scanning head 2 and the generating line of the photoconductive drum 3. The SELFOC lens array 4 is composed of a plurality of CELFOC lens arranged in one or more lines along the light-emitting part of the scanning head 2, each of which takes a radial straight line of the photoconductive drum 3 as an optical axis. The CELFOC lens array 4 focuses a light beam from the light-emitting part of the scanning head 2 on the generating line of the photoconductive drum 3. The photoconductive drum 3 forms an electrostatic latent image on the peripheral surface when exposed by the scanning head 2.

Figure 2:
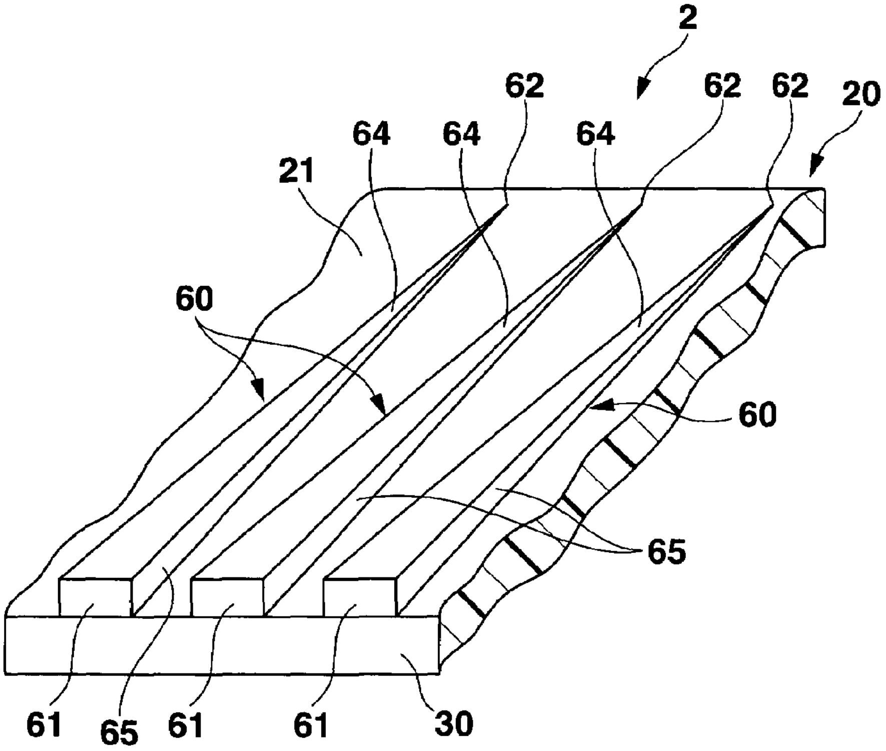
FIG. 2 is a perspective view showing the configuration of three dots of a scanning head.

FIG. 2 is a perspective view showing the configuration of three dots of the scanning head 2. The scanning head 2 has a surface emitting part array panel 20, and a plurality of light guide parts 60 arranged in a line on the emission plane 21 of the surface emitting part array panel 20.

Figure 3:
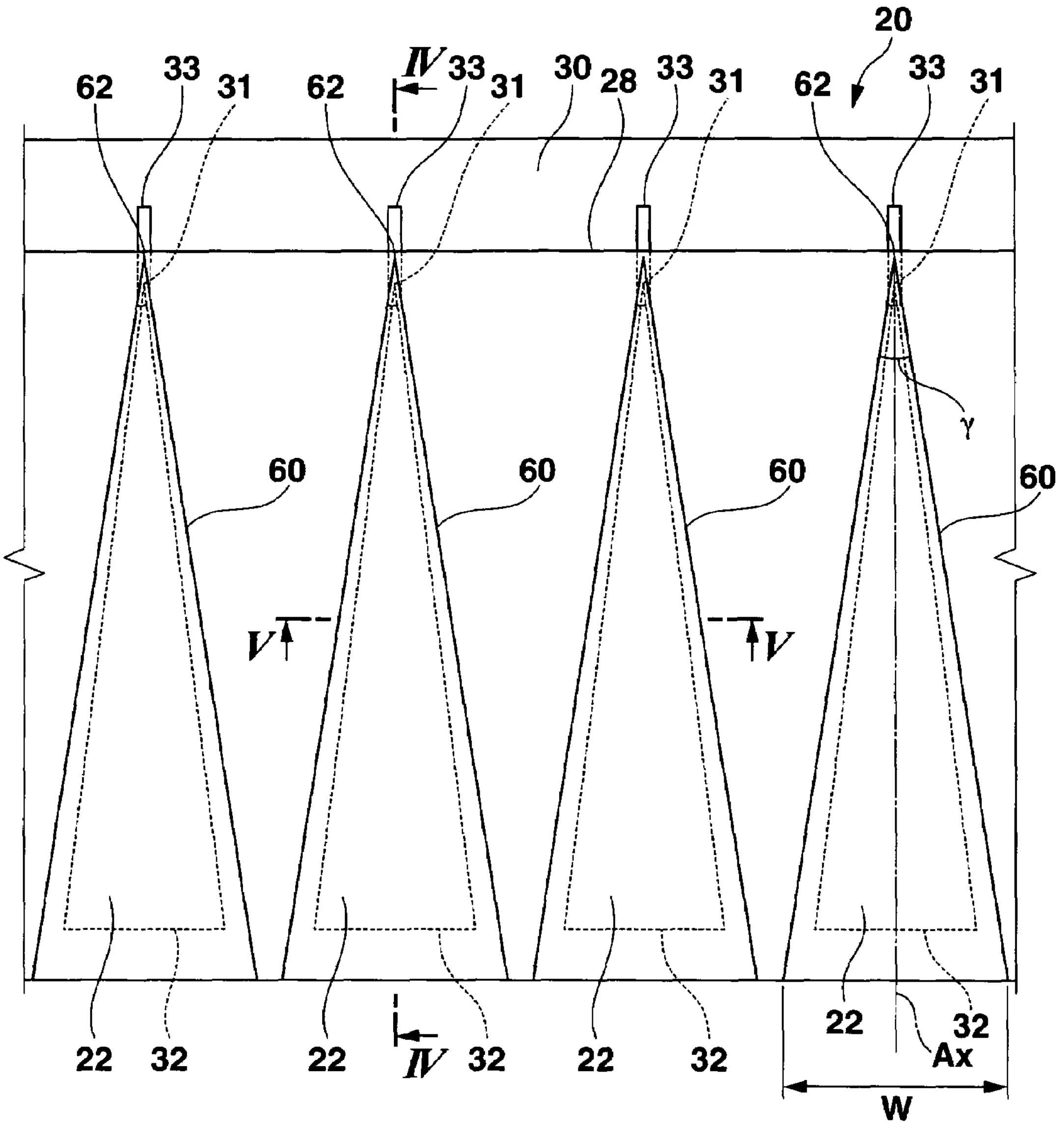
FIG. 3 is a plane view of the emitting plane of a surface emitting part array panel for four dots.
Figure 4:
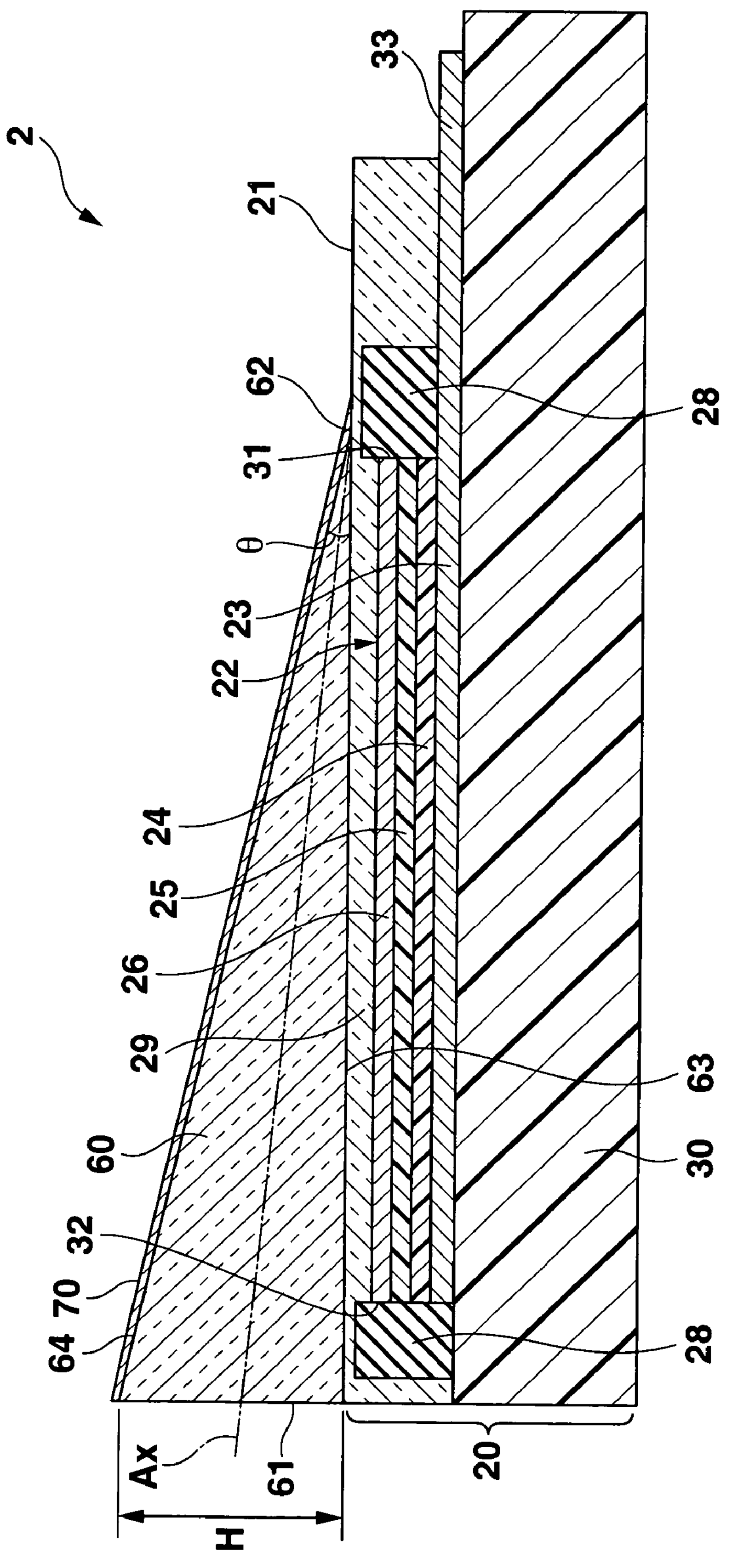
FIG. 4 is an arrow indicated cross section of the plane taken along lines IV-IV of FIG. 3.
Figure 5:
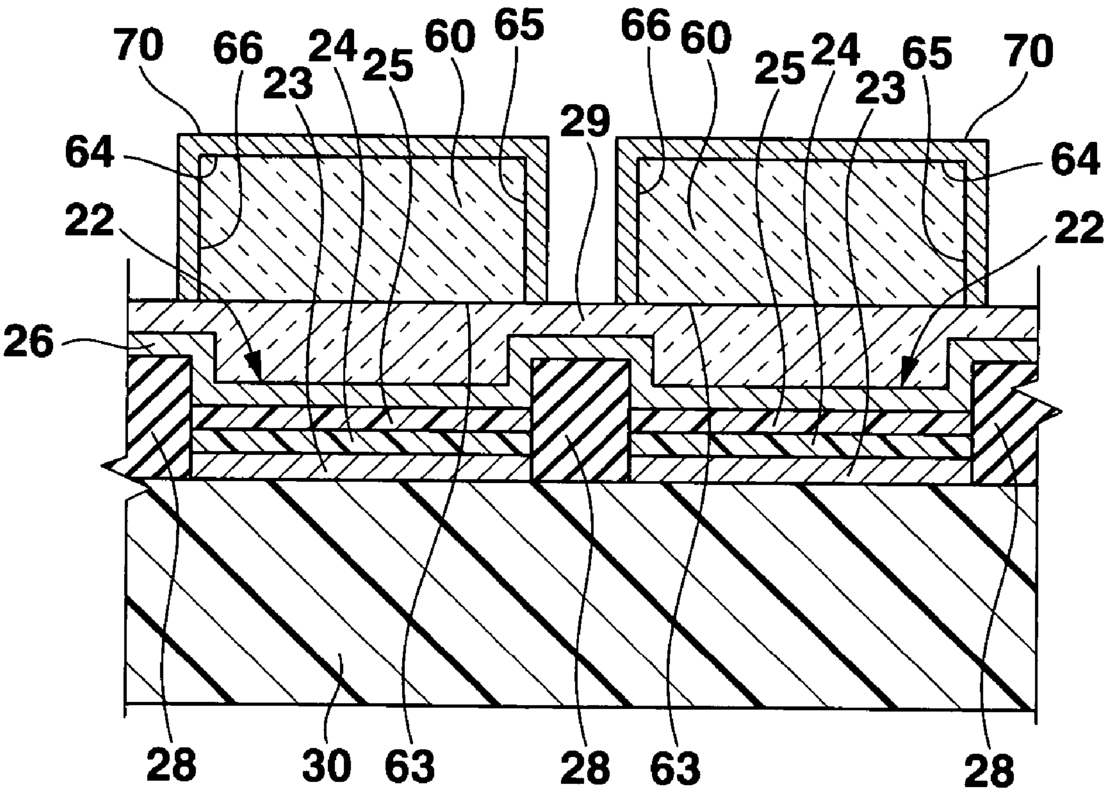
FIG. 5 is an arrow indicated cross section of the plane along the cutting lines V-V of FIG. 3.

FIG. 3 is a plane view showing the emission plane 21 (FIG. 4) of the surface emitting part array panel 20. FIG. 4 is an arrow indicated cross section of the plane along the thickness of an insulating substrate 30 passing lines IV-IV of FIG. 3. FIG. 5 is an arrow indicated cross section of the plane along the thickness of an insulating substrate 30 passing lines V-V of FIG. 3. As shown in FIG. 3 to FIG. 5, the surface emitting part array panel 20 is composed of more than one surface emitting part 22 shaped like substantially a wedge or triangle in a plane view, arranged in a line on the insulating substrate 30. The light emitted from the surface emitting part 22 is emitted to the plane (the emission plane 21) opposite to the insulating substrate 30.

Each surface emitting part 22 has an organic electroluminescent element 27. Namely, the surface emitting part 22 has a lower electrode 23 formed on the insulating substrate 30, an organic electroluminescent layer stacked on the lower electrode 23, and an upper electrode 26.

The organic electroluminescent layer has a two-layer structure consisting of a positive hole carrying layer 24 and a light-emitting layer 25, for example, as shown in FIG. 4. The positive hole carrying layer 24 includes polythiophene (PEDOT) as a conductive high polymer, and polystyrene sulfonic acid (PSS) as dopant. The light-emitting layer 25 is made of polyfluorene based light-emitting material, for example. If the surface emitting part 22 emits light as an organic electroluminescent element 27, the organic electroluminescent layer between the lower electrode 23 and upper electrode 26 may not have the two-layer structure consisting of the positive hole carrying layer 24 and light-emitting layer 25. For example, the layer between the lower electrode 23 and upper electrode 26 may have a three-layer structure consisting of a positive hole carrying layer, a light-emitting layer and an electron carrying layer stacked sequentially on the lower electrode 23, or may have one-layer structure consisting of a light-emitting layer only, or may have a light-emitting layer and an electron carrying layer. It may also be a laminated structure having an electron or positive hole carrying layer interposed between appropriate layers in these layer structures, or may be another laminated structure. If the lower electrode 23 is used as a cathode and the upper electrode 26 is used as an anode, the lower electrode 23 shall have an electric charge carrying layer with an electron carrying property, and the upper electrode 26 shall have an electric charge carrying layer with a positive hole carrying property.

The lower electrode 23 preferably has a reflective property for the light of the organic electroluminescent layer, and is preferably made of material easy to carry a positive hole for the positive hole carrying layer 24, including metal such as aluminum, chromium or titanium, when used as an anode. The lower electrode 23 may be a layered product, which has such a reflective conductive layer as a lower layer, and has a transparent conductive layer containing at least one of tin doped indium oxide (ITO), zinc doped indium oxide, indium oxide ($In_2O_3$), tin oxide ($SnO_2$), zinc oxide (ZnO) and cadmium tin oxide ($CdSnO_4$), as an upper layer just like contacting the positive hole carrying layer 24.

The upper electrode 26 has a transmissible property for the light of the organic electroluminescent layer, and is a layered product composed of an electron carrying film with a thickness of 1-20 nm, preferably 5-12 nm, which is made of material with a work function lower than an anode made of a single substance or alloy containing at least one of indium, magnesium, calcium, lithium, barium and rare earth metal, and provided on the surface contacting a charge carrying layer with an electron carrying property, when used as a cathode; and a transparent conductive layer containing at least one of tin doped indium oxide (ITO), zinc doped indium oxide, indium oxide ($In_2O_3$), tin oxide ($SnO_2$), zinc oxide (ZnO) and cadmium tin oxide ($CdSnO_4$) with a thickness of 30-200 nm, to decrease a sheet resistance as a cathode, when used as an anode. The upper electrode 26 is composed of a transparent conductive layer containing at least one of tin doped indium oxide (ITO), zinc doped indium oxide, indium oxide ($In_2O_3$), tin oxide ($SnO_2$), zinc oxide (ZnO) and cadmium tin oxide ($CdSnO_4$) on the surface contacting the charge carrying layer with a positive hole carrying property, when used as an anode electrode.

The upper electrode 26 and lower electrode 23 are spaced, so that at least one of these electrodes is electrically insulated from the surface emitting part 22 and the two or more surface emitting parts 22 separately emit light. As shown in FIG. 5, in this embodiment, the lower electrode 23 is formed separately for each surface emitting part 22, and the upper electrode 26 is formed evenly as a film common to all surface emitting parts 22.

The positive hole carrying layer 24 may be formed separately for each surface emitting part 22, and may be formed evenly as a film common to all surface emitting parts 22. The light-emitting layer 25 may also be formed separately for each surface emitting part 22, and may be formed evenly as a film common to all surface emitting parts 22. The positive hole carrying layer 24 may be formed evenly as a film common to all surface emitting parts 22, and the light-emitting layer 25 may be formed separately for each surface emitting part 22, as a light-emitting layer to emit light with a different color. In this embodiment, the positive hole carrying layer 24 and light-emitting layer 25 are both formed separately for each surface emitting part 22.

In this embodiment, the lower electrode 23, positive hole carrying layer 24 and light-emitting layer 25 are formed separately and parted for each surface emitting part 22, and the lower electrode 23, positive hole carrying layer 24 and light-emitting layer 25 are enclosed by an insulating film 28. The insulating film 28 is made of inorganic substance such as silicon nitride and silicon dioxide, or made of photoconductive resin such as polyimide. The insulating film 28 is preferably lightproof to prevent propagation of the light emitted from the light-emitting layer 25 of each surface emitting part 22 to the light-emitting layer 25 of the adjacent surface emitting part 22.

The exposed surfaces of the insulating film 28 and upper electrode 26 (the outside surface of the insulating film 28 and the upper surfaces of the insulating film 28 and upper electrode 26, as shown in FIGS. 4 and 5) are covered by a smooth transparent sealing film 29. As a result, the lower electrode 23, positive hole carrying layer 24, light-emitting layer 25 and insulating film 28 are sealed by the sealing film 29. As the surface emitting part 22 is a top emission type organic electroluminescent element 27, the surface (upper surface) of the sealing film 29 becomes an emission plane of the surface emitting part 22.

A light guide part 60 is provided oppositely to the surface emitting part 22. A dot radiation element is composed of the surface emitting part 22 and the opposite light guide part 60. The light guide part 60 will be explained hereinafter.

The light guide part 60 is made of transparent material, such as polymethyl, methacrylate, polydimethylsiloxane, polycarbonate, cyclic olefin polymer, and has transmissivity. The light guide part 60 is a quadrangular pyramid, as shown in FIGS. 1-5.

One of the four sides of the light guide part 60 (the lower side in FIGS. 4 and 5) is an entrance plane 63 to receive the light from the surface emitting part 22, and the bottom (the left side in FIG. 4) is an exit plane 61. The sides other than the exit plane 61 and entrance plane 63 are reflection planes to reflect the light in the surface emitting part 22, and composed of an opposite reflection plane 64 opposite to the entrance plane 63, and side reflection planes 65 and 66 between the peripheral edge of the entrance plane 63 and the peripheral edge of the opposite reflection plane 64. The opposite reflection plane 64 is opposite to the entrance plane 63 in the state inclined in one direction toward the entrance plane 63. The exit plane or surface 61 is a flat plane opposite to the apex angle 62 that is an included angle between the opposite reflection plane 64 and entrance plane 63. The included angle formed by the exit plane 61 and entrance plane 63 is substantially a right angle. The side reflection planes 65 and 66 are rectangular to the entrance plane 63, and the side contacting the opposite reflection plane 64 is substantially wedge-shaped having a predetermined elevation angle θ (θ=0°) from the apex angle 62 to the exit plane 61. At the same time, the side reflection planes 65 and 66 are crossed forming an included angle γ (γ=0°). As a result, the light guide part 60 is shaped like a pyramid with the rectangular sectional area cut parallel to the exit plane 61 or the bottom gradually increased as approaching from the part of the apex angle 62 to the exit plane 61, or as approaching the exit plane 61. The area of the entrance plane 63 of the light guide part 60 is set larger than the area of the exit plane 61.

On these reflection planes, a reflection film 70 made of material with high reflectivity to the light from the surface emitting part 22 (e.g., metal and alloy) is substantially entirely formed. The reflection film 70 is formed separately for each light guide part 60. Therefore, the parts covering the opposite reflection plane 64 and side reflection planes 65 and 66 are substantially wedge-shaped.

The exit plane of the surface emitting part 22 is shaped similar to the entrance plane 63 of the light guide part 60 with substantially the same dimensions (a little smaller in this embodiment), as shown in FIG. 3, and emits a light beam like a wedge expanding in width from one end 31 to the other end 32, or as approaching the exit plane 61. The area of the exit plane of the surface emitting part 22 is 80-110%, preferably 85-99% of the area of the entrance plane 63 of the light guide part 60. For the emission of sedge-shaped light of the surface emitting part 22, the electrode formed separately for each surface emitting part 22 out of the upper and lower electrodes 26 and 23, the lower electrode 23 in this embodiment, is formed like a wedge. In the surface emitting part 22, the whole exit plane preferably overlaps the entrance plane 63 of the corresponding light guide part 60, so that light is not emitted to the light guide part 60 corresponding to the adjacent surface emitting part 22.

The entrance plane 63 of the light guide part 60 entirely contacts just like facing the exit plane of the surface emitting part 22, the shape of the entrance plane 63 of the light guide part 60 overlaps the emission form of the surface emitting part 22, the apex angle 62 of the light guide part 60 is located at the vertex or close to the vertex of one end 31 of the surface emitting part 22, and the entrance plane 61 of the light guide part 60 is parallel to the bottom side of the other end 32 of the surface emitting part 22. The direction of a principal axis passing through one end 31 of the surface emitting part 22 and orthogonal to the other end face 32 is identical to the direction of a principal axis Ax (FIG. 4) of the light guide part 60 viewed from the normal of the surface emitting part 22.

As explained above, the opposite reflection plane 64 of the light guide part 60, or the width W (FIG. 3) of the light guide part 60, is set to be gradually prolonged from the apex 62 to the exit plane 61, or as approaching the exit plane 61. The side reflection planes 65 and 66 of the light guide part 60, or the height H (FIG. 4) of the light guide part 60 are set to be gradually prolonged from the apex angle 62 to the exit plane 61, or as approaching the exit plane 61.

The light guide part 60 can be formed by using nano-inprint technology, that is, flowing polydimethylsiloxane resin, a kind of silicon rubber, in a resist pattern, and solidifying it as a mold.

As shown in FIG. 1, the exit plane 61 of the light guide part 60 is opposite to the entrance plane of the SELFOC lens array 4, so that the exit plane 61 of the light guide parts 60 becomes a light-emitting part of the scanning head 2, and the principal axis Ax of the light guide part 60 coincides with the optical axis of the CELFOC lens array 4.

A driving circuit 80 is provided on one side of the surface emitting part array panel 20, a wiring 33 connected electrically to the lower electrode 23 of the surface emitting part 22 is also electrically connected to the driving circuit 80. The driving circuit 80 applies a light emission voltage to the lower electrode 23 through the wiring 33. The upper electrode 26 is held at a constant voltage, and for example, the upper electrode 26 is grounded.

For driving the scanning head 2, the driving circuit 80 applies a light emission voltage to the lower electrode 23 of each surface emitting part 22, based on an image signal. Each surface emitting part 22 emits a light beam onto the light-emitting layer 25 with the intensity according to the potential difference between the lower electrode 23 and upper electrode 26. In this time, since the light-emitting layer overlapping the lower electrode 23 and upper electrode 26 is wedge-shaped, the surface emitting part 22 emits light like a wedge. The wedge pattern light emitted from the surface emitting part 22 enters the entrance plane 63 of the light guide part 60. Since the light guide part 60 is set to have an included angle γ and elevation angle θ, the entered light is given directivity to advance toward the exit plane 61, and propagated in the light guide part 60, while repeating reflection on the entrance plane 63, opposite reflection plane 54 and side reflection planes 65 and 66, and by the reflection member, such as the lower electrode 23 of the surface emitting part 22, and finally output from the exit plane 61 of the light guide part 60 substantially along the principal axis Ax of the light guide part 60. In this way, the light guide part 60 itself functions as a light adjusting part to adjust the directivity of an incident light beam. Therefore, the light entered the entrance plane 63 of the light guide part 60 is efficiently emitted from the exit plane 61. The light beam emitted from the exit plane 61 of the light guide part 60 is focused at the generating line of the photoconductive drum 3 by the CELFOC lens array 4, forming an image on the side of the photoconductive drum 3.

As explained above, according to this embodiment, since the area of the exit plane 61 of the light guide part 60 is smaller than the area of the entrance plane 63, the light emitted from the surface emitting part 22 into the entrance plane 63 of the light guide part 60 is outputted from the exit plane 61 in being converged. As a result, the light beam is emitted with a high intensity from the exit plane 61 of the light guide part 60, even if the emission intensity per a unit area of the surface emitting part 22 is low. Therefore, the photoconductive drum 3 is exposed in a short time without increasing the sensitivity of the photoconductive drum, and the photoconductive drum 3 can be rotated at high speed. As a result, the printing time can be reduced.

It can be considered to increase the emission intensity of the surface emitting part 22 to increase the intensity of the light beam output from the exit plane 61 of the light guide part 60. But, if the emission intensity of the surface emitting part 22 is increased, the life of the surface emitting part 22 will be reduced. However, in this embodiment, the light emitted from the surface emitting part 22 to the entrance plane 63 of the light guide part 60 is outputted from the exit plane 61 in the converged state, and the intensity of the light output from the exit plane 61 of the light guide part 60 can be increased also by increasing the light-emitting area of the surface emitting part 22. Even if the light-emitting area of the surface emitting part 22 is increased, the light intensity on the exit plane 61 of the light guide part 60 is increased without increasing the area of the exit plane 61 of the light guide part 60, by expanding the area of the entrance plane 63 of the light guide part 60 to meet the expanded light-emitting area of the surface emitting part 22. Therefore, an image can be formed with high resolution without increasing a dot diameter.

Further, the shape of the light guide part 60 is set so that the light entered into the light guide part 60 easily advances to the exit plane 61 of the light guide part 60, and the light taken in from the entrance plane of the light guide part 60 can be efficiently emitted. Directivity is given to increase the light intensity in the direction of the principal axis Ax of the light guide part 60, and the light beam can be efficiently applied to the CELFOC lens array 4. The light use efficiency is increased, and the photoconductive drum 3 can be exposed in short time and rotated at high speed without increasing the sensitivity, and the printing time can be increased.

The invention is not limited to the above embodiments. Various improvements and design changes are permitted without departing from the spirit or essential characteristics of the invention. Examples of modification will be explained hereinafter.

[Modification 1]

Figure 6A:
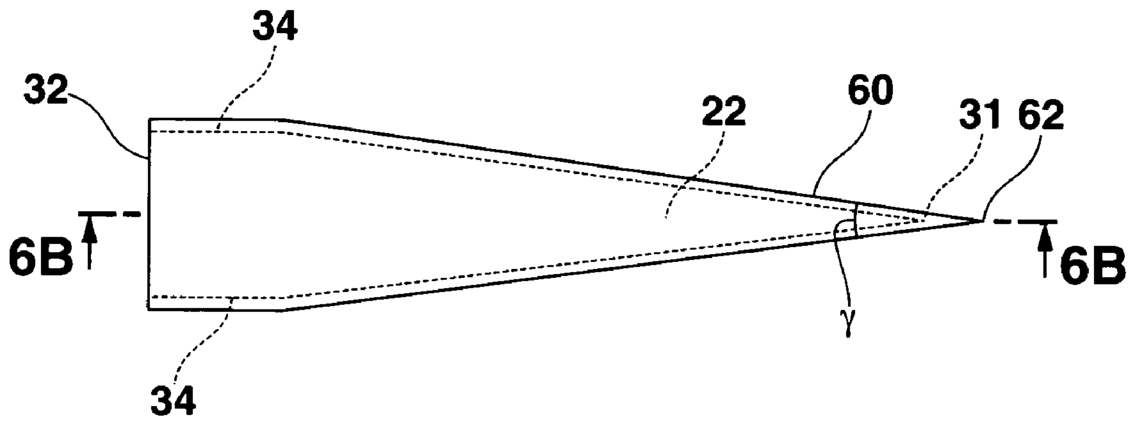
FIG. 6A is a plane view showing a dot radiation element in a modification.
Figure 6B:
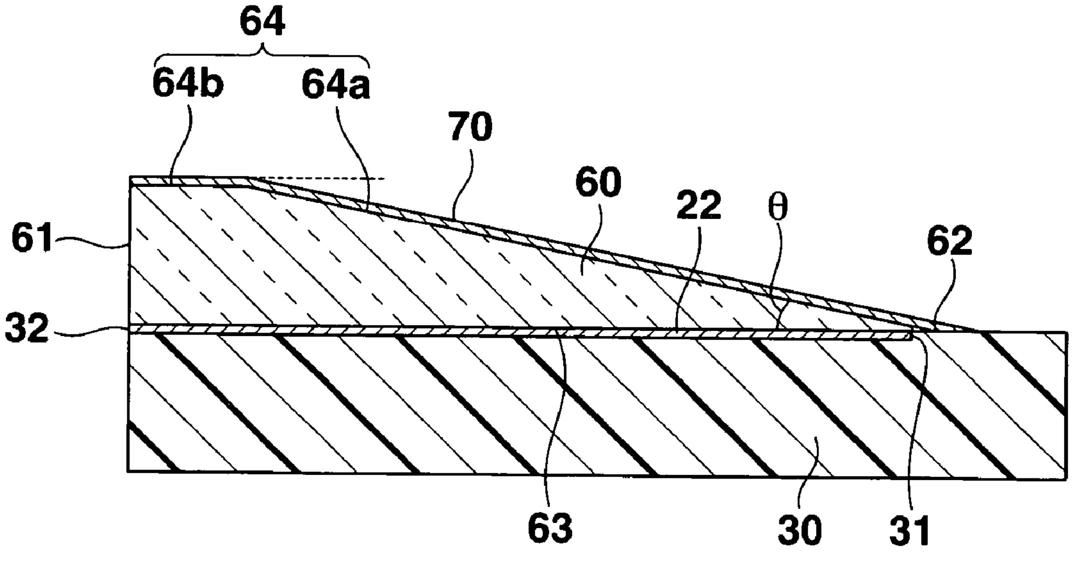
FIG. 6B is a sectional view along the cutting lines 6B-6B of FIG. 6A.
Figure 7A:
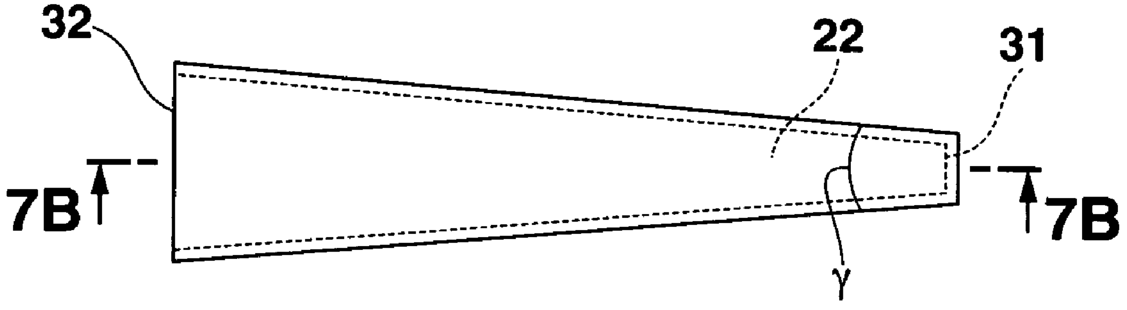
FIG. 7A is a plane view showing a dot radiation element in another modification.
Figure 7B:
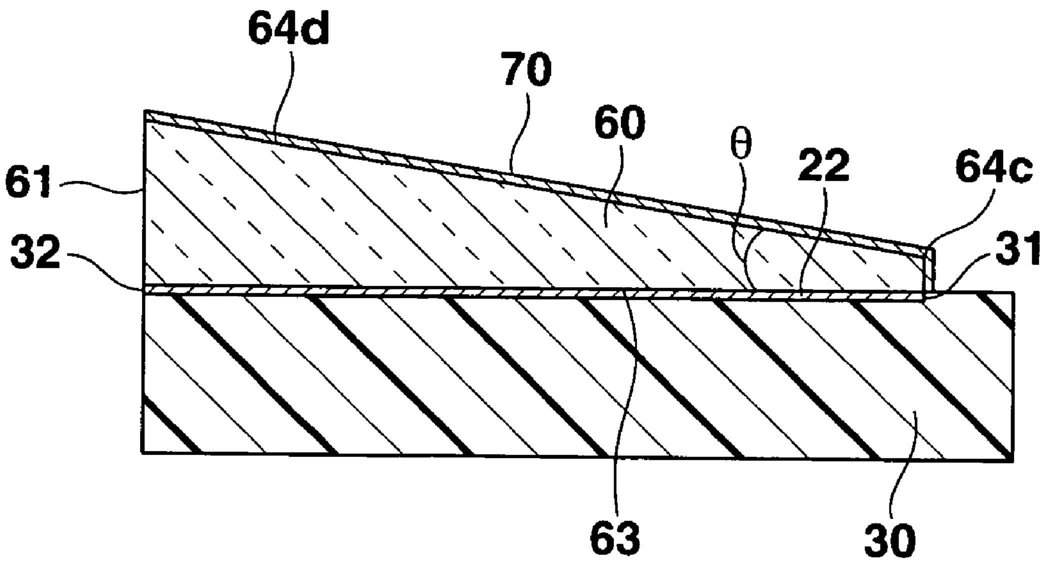
FIG. 7B is a sectional view along the cutting lines 7B-7B of FIG. 7A.
Figure 8A:
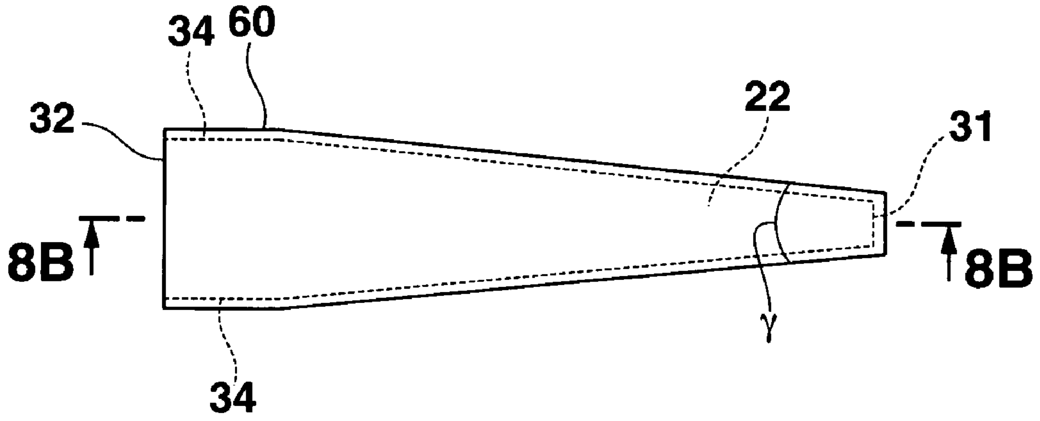
FIG. 8A is a plane view showing a dot radiation element in another modification.
Figure 8B:
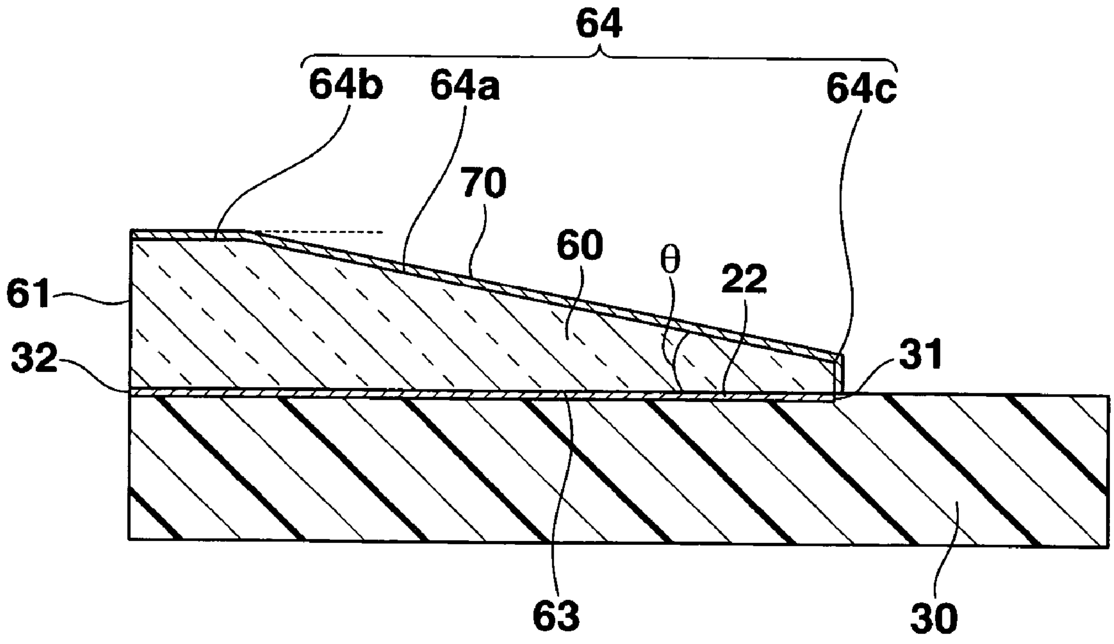
FIG. 8B is a sectional view along the cutting lines 8B-8B of FIG. 8A.

FIG. 6A to FIG. 8B show modifications of the invention, in which the emission form of the surface emitting part 22 and the shape of the light guide part 60 are modified. FIG. 6A, FIG. 7A, and FIG. 8A are plane views showing the emission form of the surface emitting part 22 together with the light guide part 60. FIG. 6B, FIG. 7B and FIG. 8B are arrow indicated cross sections of the planes along the thickness direction of the insulating substrate 30, passing the cutting lines 6B-6B, 7B-7B and 8B-8B of FIG. 6A, FIG. 7A and FIG. 8A, respectively. To simplify the figures, the layers of the surface emitting part 22 are omitted.

As shown in FIG. 6A, the included angle at one end 31 is set to $\gamma$ ($\gamma>0°$), and the surface emitting part 22 is pentagonal with both sides 34 of the other end 32 made parallel to each other, so that the width is increased to the substantial halfway and becomes constant from the halfway, as approaching the exit plane 61. The shape of the entrance plane 63 of the light guide part 60 is similar to the emission form of the surface emitting part 22, and the area of the surface emitting part 22 is 80-110%, preferably 85-99% of the area of the entrance plane or light receiving surface 63 of the light guide part 60. The whole surface of the surface emitting part 22 preferably overlaps the entrance plane 63 of the corresponding light guide part 60, so that light is not emitted into the light guide part 60 corresponding to the adjacent surface emitting part 22. Similarly, the light guide part 60 has an included angle of $\gamma$. As shown in FIG. 6B, the opposite reflection plane 64 of the light guide part 60 is divided into an inclined reflection flat plane 64*a* which is inclined with a predetermined elevation angle $\theta$ from the apex 62 to the exit plane 61, and a parallel reflection flat plane 64*b* which corresponds to the side 34 and is parallel to the entrance plane 63. Therefore, the sectional area parallel to the exit plane 61 is gradually expanded from the apex angle 62 to both side sides 34, but the sectional area of the parts corresponding to both sides of the other end 32 is even. The part surrounded by the inclined reflection plane 64*a*, side reflection planes 65/66 and the entrance plane 63 functions as a light adjusting part to adjust the directivity of incident light.

As shown in FIG. 7A, the emission form or plane of the surface emitting part 22 is trapezoidal with the width increased from one end 31 to the other end 32, or as approaching the exit plane 61. The one end 31 is short, and the other end 32 is long. In the surface emitting part 22, the inclination angle between the sides is set to $\gamma$ ($\gamma>0°$). In this case, the shape and dimensions of the entrance plane 63 of the light guide part 60 is substantially similar to those of the surface emitting part 22. In the light guide part 60, a flat top plane 64*c* is formed at the position opposite to the exit plane 61. One side of the top 64*c* is identical to one side of the inclined reflection plane 64*d* that is opposite to the entrance plane 63 and has the elevation angle $\theta$ to the entrance plane 63. The area of the emission surface of the surface emitting part 22 is 80-110%, preferably 85-99% of the area of the entrance plane 63 of the light guide part 60. The whole surface of the surface emitting part 22 is preferably overlaps the entrance plane 63 of the corresponding light guide part 60, so that light is not emitted to the light guide part 60 corresponding to the adjacent surface emitting part 22. In the surface emitting part 22 having such an emission form, the light guide part 60 is a quadrangular pyramid, as shown in FIG. 7A and FIG. 7B. Namely, as the width and height of the light guide part 60 are increased, as approaching the exit plane 61, the area of the section parallel to the exit plane 61 is expanded from the included angle between the entrance plane 63 and opposite reflection plane 64, to the exit plane 61. Therefore, the light guide 60 itself functions as a light adjusting part to adjust the directivity of incident light.

In the surface emitting part 22 shown in FIG. 8A, the emission form of the surface emitting part 22 is hexagonal with the width increased from one end 31 to the halfway of the other end 32, that is, to the substantial halfway of the exit plane 61, as approaching the exit plane 61, and becomes the same thereafter. The one end 31 has a short width, and the other end 32 is opposite to the short lateral side and has a long width. In the surface emitting part 22, the inclination angle between the inclined side plane portions close to the one end 31 is set to $\gamma$ ($\gamma>0°$). Both side plane portions 34 adjacent to the long end 32 are parallel to each other. In this case, also, the shape of the entrance plane 63 of the light guide part 60 is substantially similar to the emission pattern of the surface emitting part 22. The area of the emission plane of the surface emitting part 22 is 80-110%, preferably 85-99% of the area of the entrance plane of the light guide part 60. The whole surface of the surface emitting part 22 preferably overlaps the entrance plane 63 of the corresponding light guide part 60, so that light is not emitted to the other light guide part 60 corresponding to the adjacent surface emitting part 22. In the surface emitting part 22 having such an emission form, the oppositing reflection plane 64 of the light guide part 60 is divided into an inclined reflection plane or part 64*a* which is inclined with a predetermined elevation angle $\theta$ to the entrance plane 63, a parallel reflection plane or part 64*b* which corresponds to the side 34 and is parallel to the entrance plane 63, and an upper bottom surface or part 64*c* which is provided at the position opposite to the exit plane 61, as shown in FIG. 8B. Namely, though the sectional area parallel to the exit plane 61 is expanded over the inclined reflection plane 64*a*, the sectional area of the parts corresponding to both sides 34 of the other end 32 is even. As a result, the part surrounded by the inclined reflection plane 64*a*, side reflection planes 65, 66 and entrance plane 63 functions as a light adjusting part to adjust the directivity of incident light.

The surface emitting part 22 can be lit in the form shown in FIG. 8A, by changing appropriately the shape of the light-emitting layer 24 of the part which overlaps the lower electrode 23 and upper electrode 26, or the shape of the lower electrode 23 with the whole surface covered by the upper electrode 26 and light-emitting layer 25.

In either FIG. 6A or FIG. 8A, the area of the entrance plane or light receiving surface 63 of the light guide part 60 is preferably larger than the area of the exit plane or light emitting surface 61. Even if the emission intensity per unit area of the surface emitting part 22 is low, the exit plane 61 of the light guide part 60 emits a light beam with a high intensity. The light guide 60 is expanded from the included angle side between the entrance plane 63 and opposite reflection plane 64, to the exit plane 61, and the directivity of light in the direction vertical to the exit plane 61 is improved.

[Modification 2]

Figure 9:
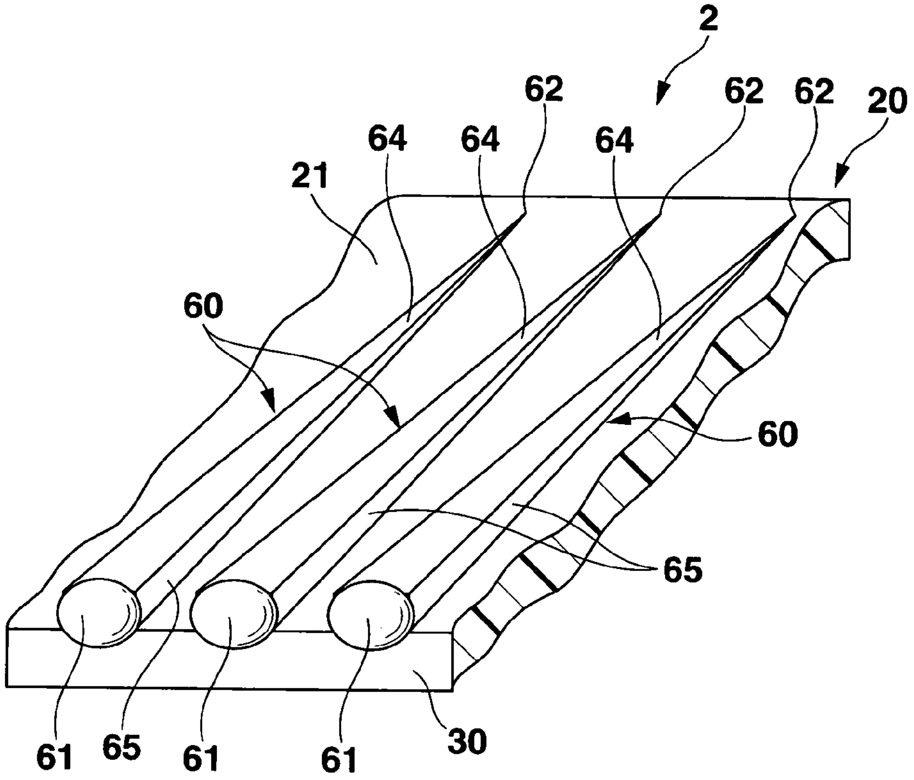
FIG. 9 is a perspective view showing the configuration of three dots of a scanning head in another modification.

In the embodiment and modification explained above, the exit plane 61 of the light guide part 60 is flat. The exit plane 61 may be configured to function as a lens surface. For example, as shown in FIG. 9, the exit plane light emitting surface 61 may function as a condenser lens surface if the surface is formed as a convex surface. In this case, an the exit plane 61 functions as a lens surface, and thus emitted light beam can be condensed on the generating line of the photoconductive drum 3 without the CELFOC lens array 4 shown in FIG. 1.

[Modification 3]

Figure 10:
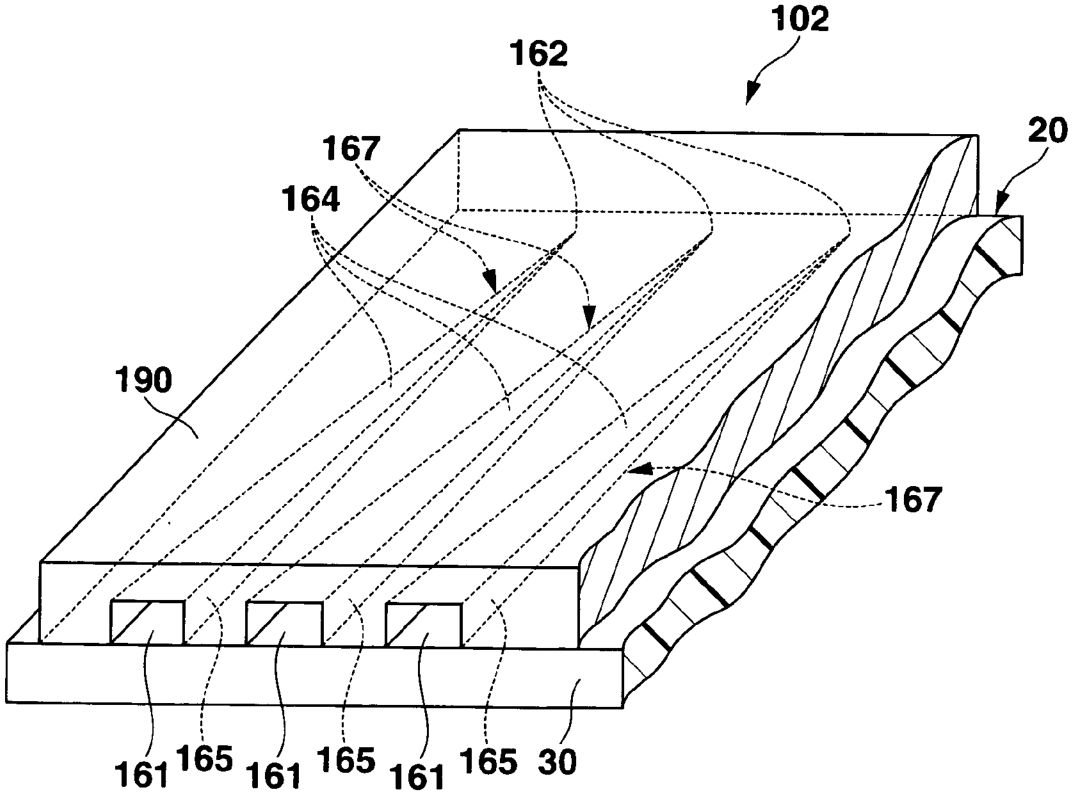
FIG. 10 is a perspective view showing the configuration of three dots of a scanning head in another modification.
Figure 11:
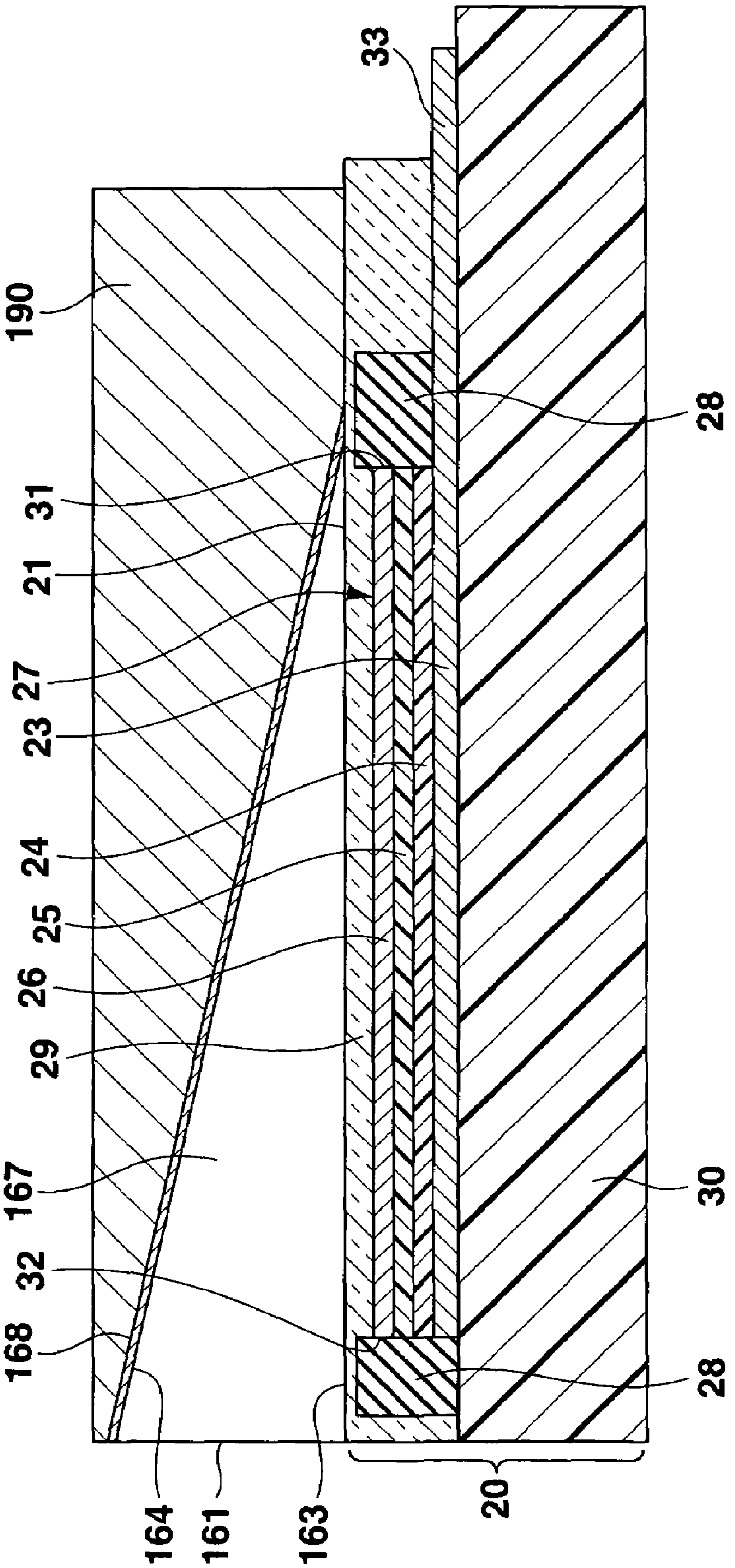
FIG. 11 is a sectional view of a longitudinal section for one dot of a scanning head.
Figure 12:
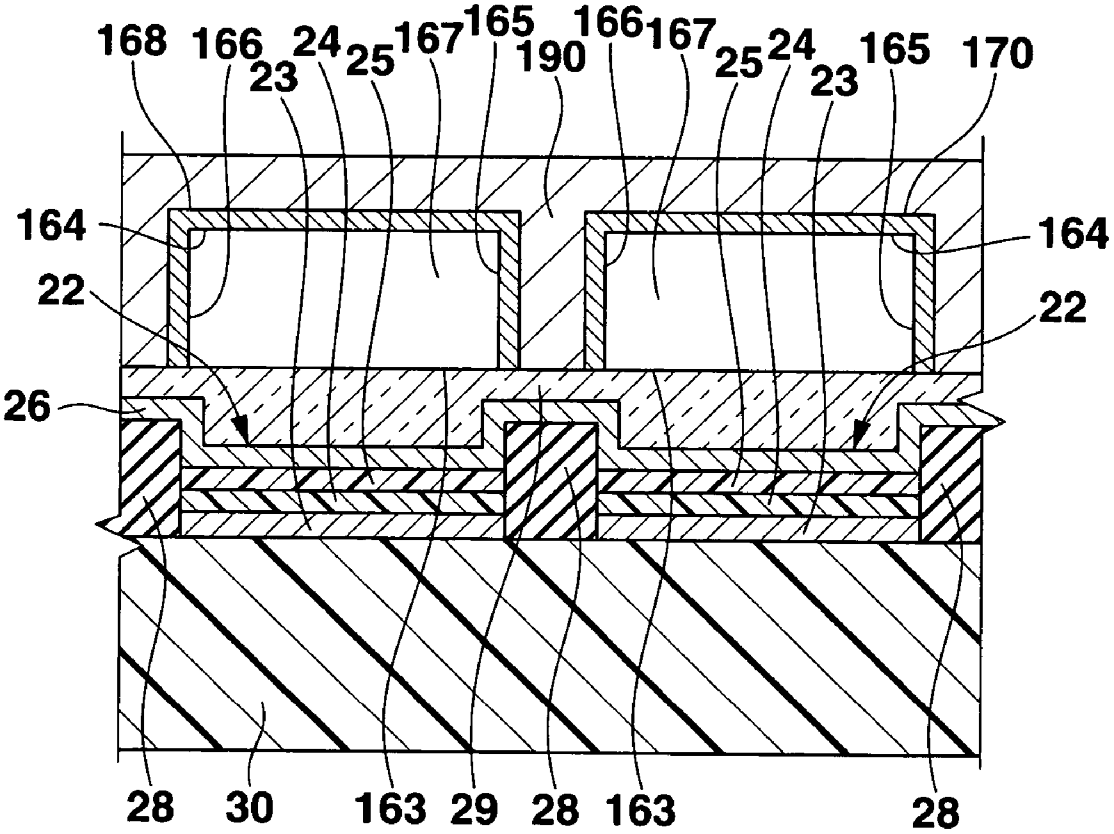
FIG. 12 is a sectional view of a cross section orthogonal to the cross section of FIG. 11.

In the embodiment and modifications explained above, the light guide part is made of transparent solid material such as resin or glass. A part 167 corresponding to the body of the light guide part 60 may be hollow, and the hollow light guide part 167 may be made of gaseous matter such as air, as shown in FIG. 10 to FIG. 12. To form the hollow light guide part 167, a plurality of hollow light guide parts 167 are depressed or grooved on one side of an opposite substrate 190 made of such as glass, a reflection film 168 is formed on the inside wall surface (opposite surface 164) of these hollow light guide parts 167, one hollow light guide part 167 is related to one surface emitting part 22, and the side with the hollow light guide part 167 formed is stuck to the emission plane 21 of the surface emitting part array panel 20. The hollow light guide part 167 is extended to the side end face of the opposite substrate 190, and the extended one end of the hollow light guide part 167 is opened as an opening 161 which becomes an exit plane or light emitting part. The shape of the hollow light guide part 167 is preferably the same as the light guide part 60, and the hollow light guide part 167 is formed as a pyramid with the opening area reduced in the part from the opening 161 to the end 162. The part 163 of the hollow light guide part 167, facing the surface emitting part 22 serves as an entrance plane, the opposite side surface 164 serves as an opposite reflection plane, and the opening 161 serves as an exit plane. Reflection film 168 are formed also on the side reflection planes 165 and 166, thus, the side reflection planes 165 and 166 serve as a reflection plane. Even if the area of the opening 161 of the hollow light guide part 167 is smaller than the light emitting area of the surface emitting part 22 and the emission intensity per a unit area of the surface emitting part 22 is low, as in the case shown in FIG. 10, the rectangular opening 161 of the hollow light guide part 167 emits light with a high intensity. The opening area of the hollow light guide part 167 is reduced in the part from the opening 161 to the end 162, and the directivity of light is improved.

[Modification 4]

Figure 13:
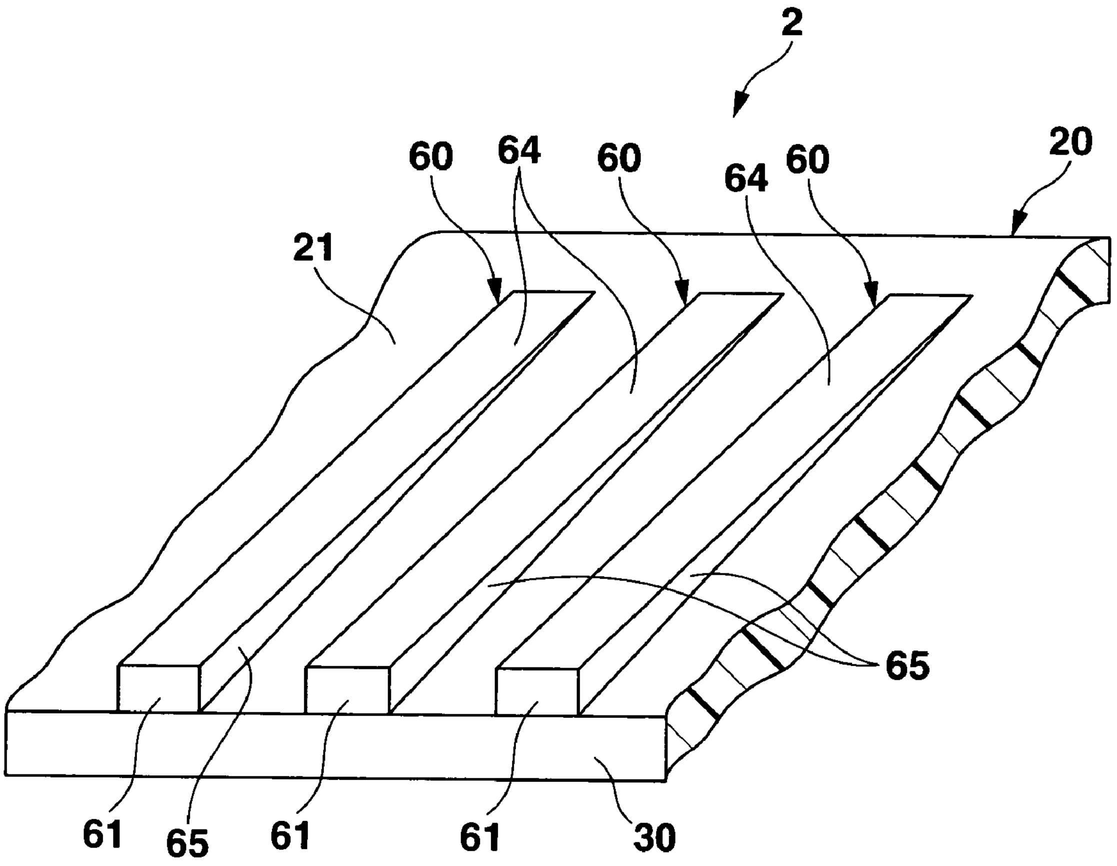
FIG. 13 is a perspective view showing the configuration of three dots of a scanning head in another modification.

In the embodiment and modifications explained above, the light guide parts 60 and 167 are formed to have wedge-shaped entrance plane 63 and opposite reflection plane 64, and the area of the cross section parallel to the exit planes 61 and 161 are pyramidal expanding in the part from the apex angle 62 (the end 162) to the exit planes 61 and 161. The light guide part 60 may be formed to have rectangular entrance plane 63 and opposite reflection plane 64, as shown in FIG. 13. A reflection film is formed on the surface of its light guide part 60 except the entrance plane 63 and exit plane 61 facing the surface emitting part array panel 20. In this case, it is recommendable to make the emission form or pattern of the surface emitting part 22 the same as the shape of the entrance panel 63 of the light guide part 60. Since the light guide part 60 has such a shape that the light in the light guide part 60 may easily advance to the exit plane 61 of the light guide part 60, the light taken in from the entrance plane of the light guide part 60 can be efficiently emit and given directivity to increase the light intensity in the principal axis Ax of the light guide part 60.

[Modification 5]

Figure 14:
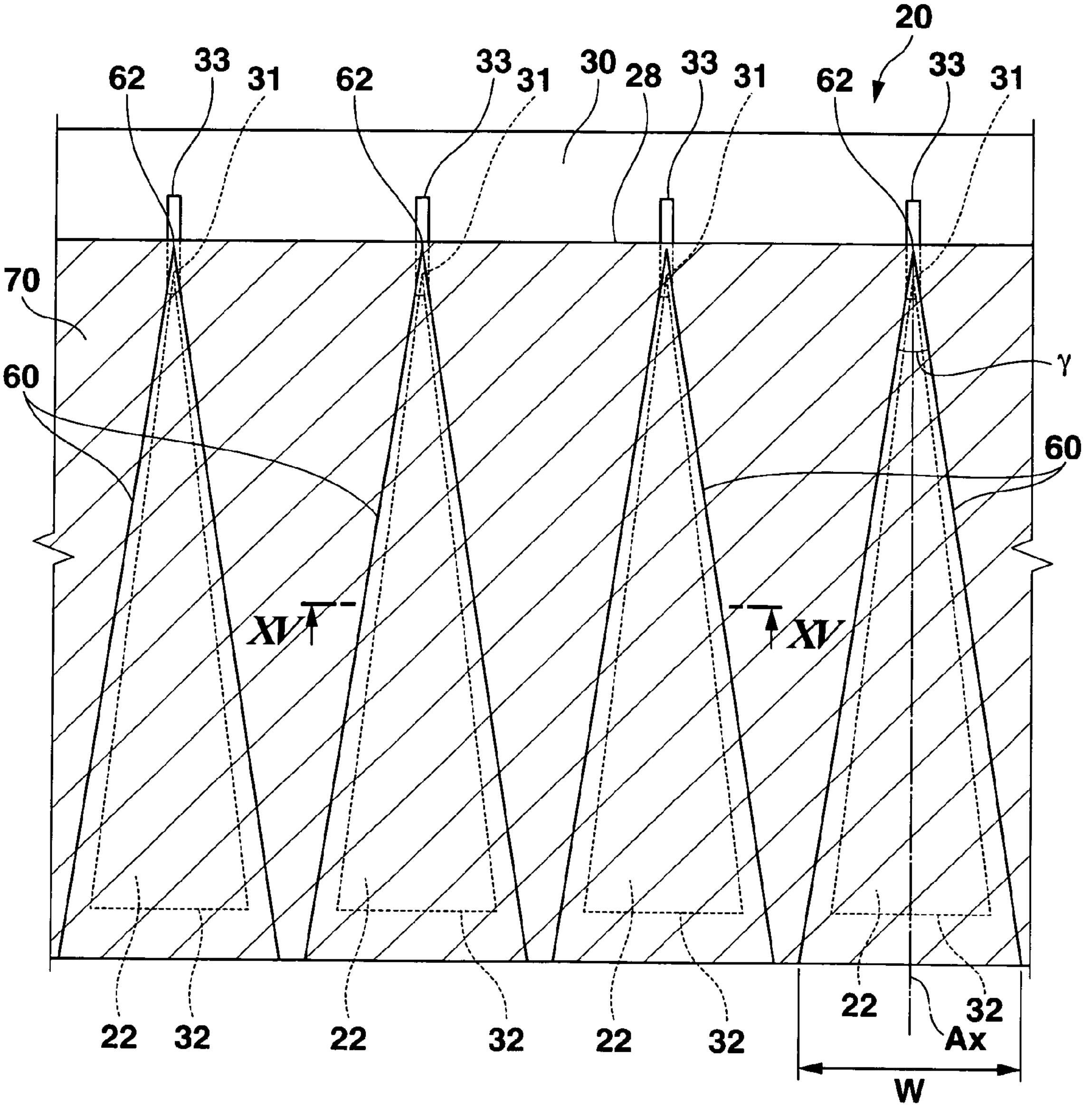
FIG. 14 is a plane view of the emitting plane of a surface emitting part array panel in another modification.
Figure 15:
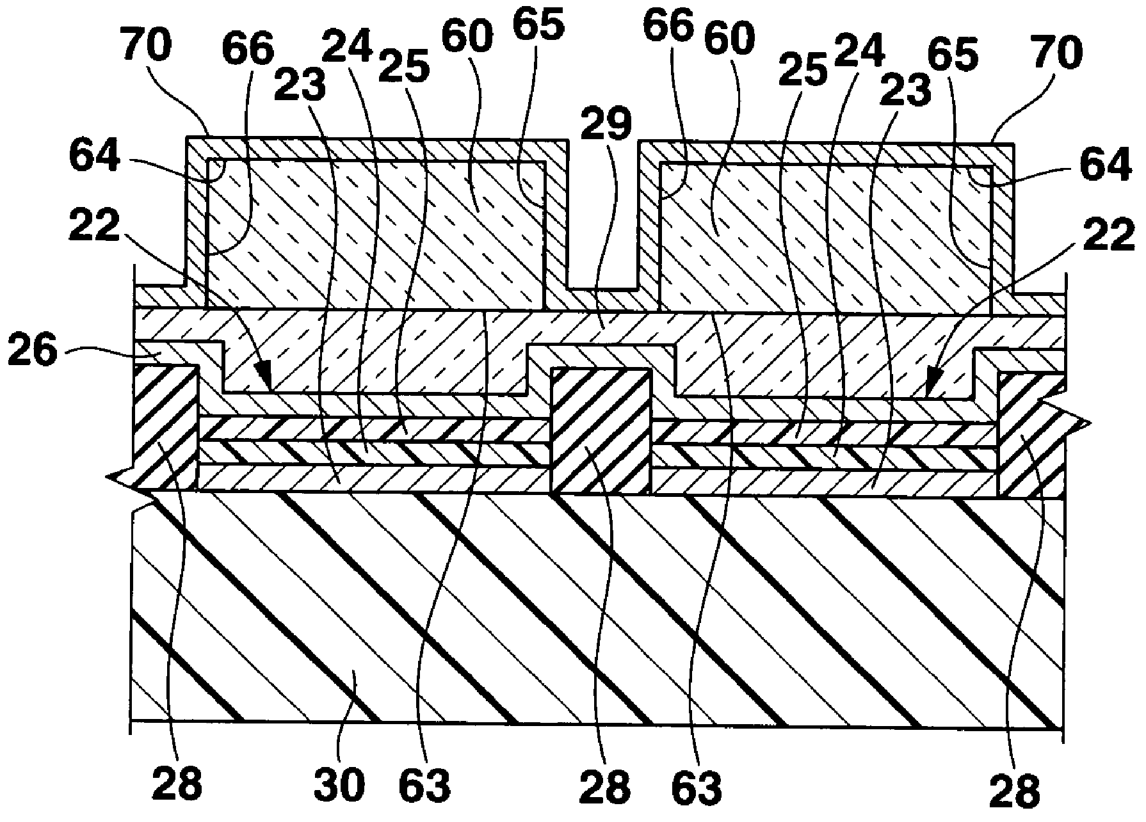
FIG. 15 is an arrow indicated cross section of a plane in another modification taken along lines XV-XV of FIG. 14.

In the embodiment and modifications explained above, the reflection films 70 and 170 are formed separately for the light guide parts 60 and 167. The reflection films may be one continuous film covering all light guide parts 60, as shown in FIG. 14 and FIG. 15. The reflection film 70 is a part hatched by slanted lines in FIG. 14. The reflection film covers not only the outside surface of the surface emitting part 22, but also the whole upper surface of the surface emitting part array panel 20, and prevents leakage of light from the upper surface of the surface emitting part array panel 20.

[Modification 6]

In the embodiment and modifications explained above, the scanning head 2 is used as a printer head. The scanning head 2 may be used as an output head to emit a light beam linearly, by combining with a linear image pickup element (line sensor) in an image input apparatus.

[Modification 7]

Figure 16:
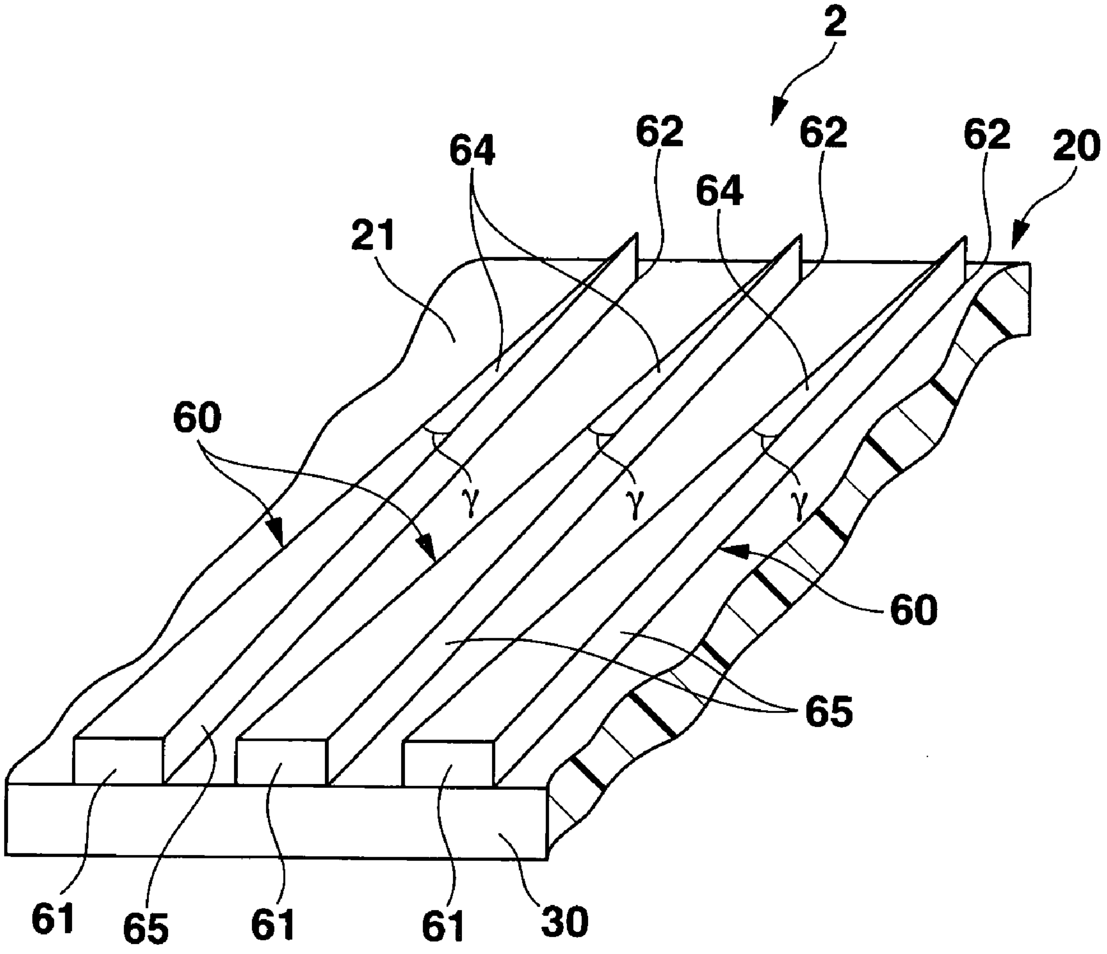
FIG. 16 is a perspective view showing the configuration of three dots of a scanning head in another modification.

In the embodiment and modifications explained above, the light guide parts 60 and 167 are formed to have the height gradually increased based on the elevation angle $\theta(\theta>0°)$ of the opposite reflection planes 64 and 164, as approaching the exit planes 61 and 161. The invention is not limited to this. Even if the opposite reflection plane 64 is placed parallel to the entrance plane, directivity is given to increase the light intensity in the principal axis Ax of the light guide part 60 as long as the sides 65 and 66 are inclined with an inclination angle of $\gamma$ $(\gamma>0°)$, as shown in FIG. 16.

[Modification 8]

In the embodiment and modifications explained above, the surface emitting part 22 is composed of the top emission type organic electroluminescent element 27, which is formed on the side provided with the light guide part of the insulating substrate 30. The surface emitting part 22 may be composed of an organic electroluminescent element of a so-called bottom emission type, which is formed on the opposite side of the light guide part of the insulating substrate 30. Namely, an organic electroluminescent element is provided on one side of the insulating substrate 30, and the light guide parts 60 and 167 are provided on the opposite side. In this case, the light from the surface emitting part 22 is diffused in the insulating substrate 30 according to the thickness of the insulating substrate 30, before reaching the entrance planes of the light guide parts 60 and 167. To compensate the light-diffusion, it is preferable to set the area of the entrance planes of the light guide parts 60 and 167 sufficiently wide with respect to the area of the exit plane of the organic electroluminescence element.

[Modification 9]

In the embodiment and modifications explained above, an organic electroluminescent element is used for the surface emitting part 22. An inorganic electroluminescent element may be used for the surface emitting part 22.

EMBODIMENT 1

The invention will be explained more concretely hereinafter by taking examples of embodiment.

Figure 17A:
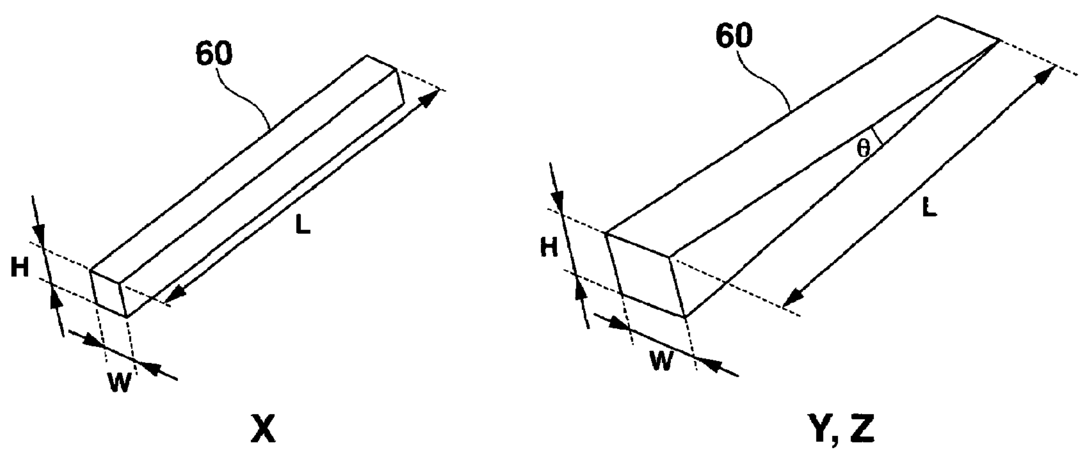
Figure 17B:
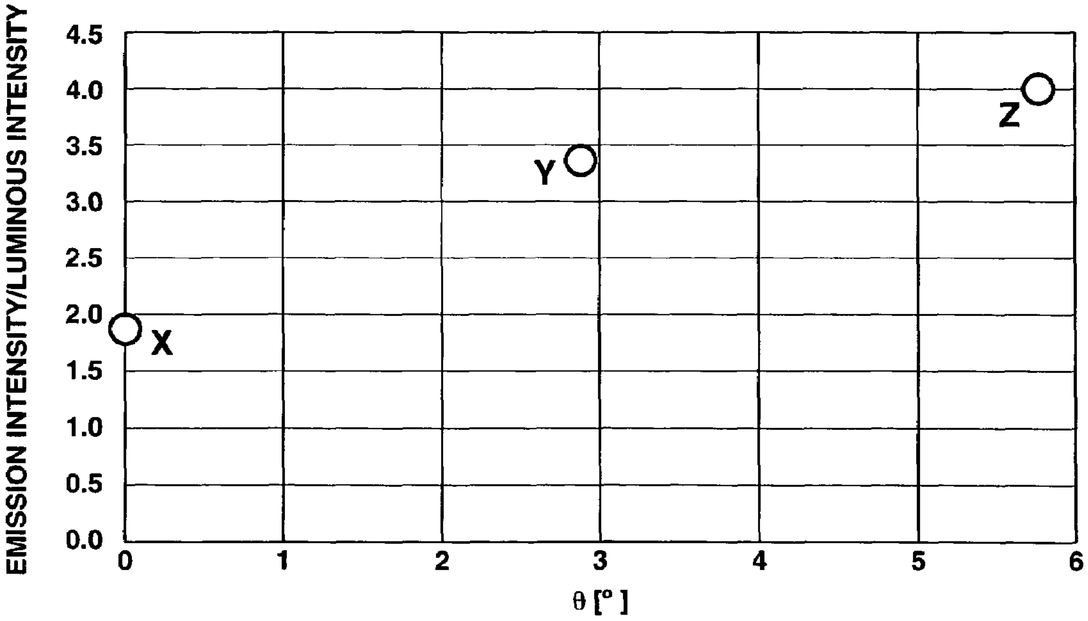

In FIG. 17B, X is an example to be compared to X in FIG. 17A, and is a simulation value of the ratio of the emission intensity (unit: W/sr $m^2$) of the exit plane 61 of the light guide part 60 to the emission intensity (unit: W/sr $m^2$) of the surface emitting part 22 of the rectangular parallelepiped light guide part, assuming that the elevation angle $\theta$ is 0°, the inclination angle $\gamma$ is 0° (the opposite reflection plane 64 is rectangular), the exit plane width W is 10 μm, the exit plane height H is 10 μm, and the length L from the exit plane to the opposite side of the light guide part 60 is 200 μm. Here, the refractive index of the light guide part 60 is 1.0, and the surface emitting part 22 is set to the same shape and size as those of the lower side of the light guide part 60.

In FIG. 17B, Y is an example to be compared to Y in FIG. 17A, and is a simulation value of the ratio of the emission intensity (unit: W/sr $m^2$) of the exit plane 61 of the light guide part 60 to the emission intensity (unit: W/sr $m^2$) of the surface emitting part 22 of the rectangular parallelepiped light guide part, assuming that the elevation angle θ is 2.86°, the inclination angle γ is 0° (the opposite reflection plane 64 is rectangular), the exit plane width W is 10 μm, the exit plane height H is 10 μm, and the length L from the exit plane to the opposite side of the light guide part 60 is 200 μm. Here, the refractive index of the light guide part 60 is 1.0, and the surface emitting part 22 is set to the same shape and size as those of the lower side of the light guide part 60.

In FIG. 17B, Z is an example to be compared to Z in FIG. 17A, and is a simulation value of the ratio of the emission intensity (unit: W/sr $m^2$) of the exit plane 61 of the light guide part 60 to the emission intensity (unit: W/sr $m^2$) of the surface emitting part 22 of the rectangular parallelepiped light guide part, assuming that the elevation angle θ is 5.72°, the inclination angle γ is 0° (the opposite reflection plane 64 is rectangular), the exit plane width W is 10 μm, the exit plane height H is 10 μm, and the length L from the exit plane to the opposite side of the light guide part 60 is 200 μm. Here, the refractive index of the light guide part 60 is 1.0, and the surface emitting part 22 is set to the same shape and size as those of the lower side of the light guide part 60.

As described above, as the elevation angle is increased from 0°, the emission intensity per unit area is increased. In other words, as the elevation angle is increased, the directivity of the emergent light from the exit plane 61 is improved, and the intensity of the emergent light is amplified. The emission efficiency of whole emission energy is 30-50%, and this efficiency is increased when the angle θ is optimized. For example, assuming that the area of the entrance plane 63 (the light-emitting area of the surface emitting part 22) is 10 times of the area of the exit plane 61, when the emission efficiency is 50%, a current density can be increased to 5 times.

EMBODIMENT 2

In a rectangular parallelepiped light guide part with an elevation angle θ=0° and an inclination angle γ=0°, the relation between the emission angle and luminous intensity of the light emitted from the exit plane of the light guide part is simulated as a comparing example. The exit plane width W of the light guide part is 10, the exit plane height H is 10 μm, the length L from the exit plane to the opposite side is 200 μm, and the refractive index is 1.0. The result is shown in the pola graph of FIG. 18A. A maximum radiation luminous intensity is approximately 1740.

In a light guide part with the same structure as the light guide part of FIG. 10, the relation between the emission angle and luminous intensity of the light emitted from the exit plane is simulated. The width W of the exit plane 161 in FIG. 10 is 10 μm, the exit plane height H is 10 μm, the length L from the apex angle 162 of the light guide part to the exit plane 161 is 200 μm, and the refractive index of the light guide part 60 is 1.0. The result is shown in FIG. 18B. In FIGS. 10 to 12, the reflection planes 165 and 166 are right triangles. In this embodiment, the side reflection planes corresponding to the reflection planes 165 and 166 are set to an isosceles triangle with the same shape and size as the opposite reflection plane 164. A maximum radiation luminous intensity is approximately 3100.

In another light guide part with the same structure as the light guide part of FIG. 10, the relation between the emission angle and luminous intensity of the light emitted from the exit plane is simulated. The width W of the exit plane 161 in FIG. 10 is 20 μm, the exit plane height H is 20 μm, the length L from the apex 162 of the light guide part to the exit plane 161 is 200 μm, and the refractive index of the light guide part 60 is 1.0. The result is shown in FIG. 18C. In FIG. 10, the reflection planes 165 and 166 are right triangles. In this embodiment, the side reflection planes corresponding to the reflection planes 165 and 166 are set to an isosceles triangle with the same shape and size as the opposite reflection plane 164. A maximum radiation luminous intensity is approximately 3690.

Figure 18A:
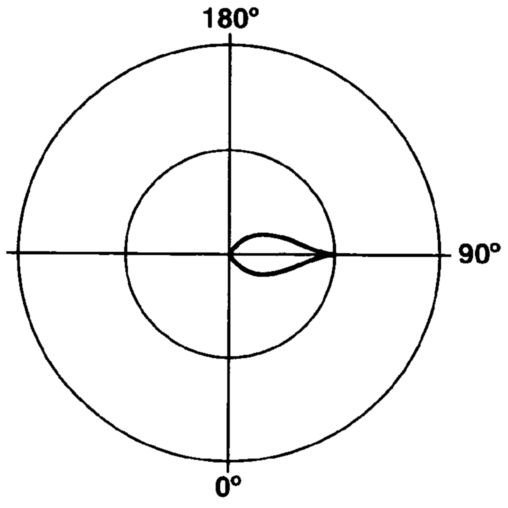
FIGS. 18A to 18C are graphs showing the relation between the radiation angle and luminous intensity of light emitted from an exit plane of a light guide part.
Figure 18B:
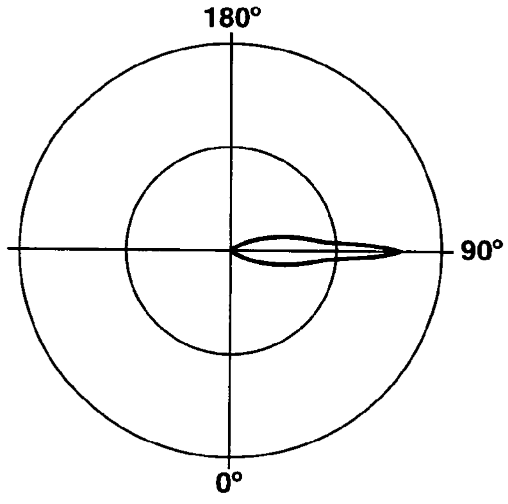
Figure 18C:
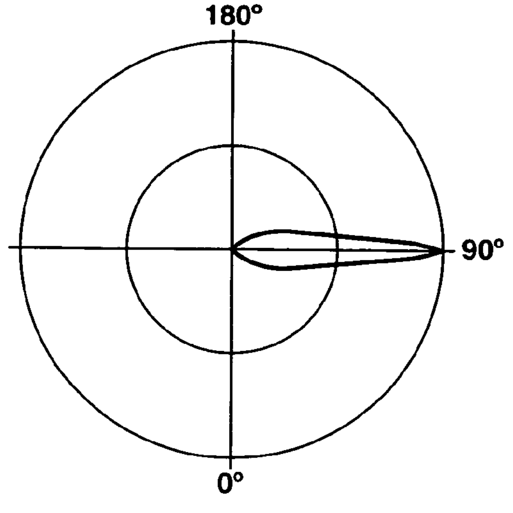

In either FIG. 18A or FIG. 18C, the radius of the graph indicates a luminous intensity, and the central angle indicates a radiation angle. As the elevation angle θ and inclination angle γ are increased, a maximum radiation luminous intensity can be increased.

Other embodiments to implement the invention will be explained hereinafter with reference to the figures. These embodiments are given various technically preferable limitations to implement the invention, but the scope of the invention is not limited to these embodiments and illustrated examples.

Figure 19:
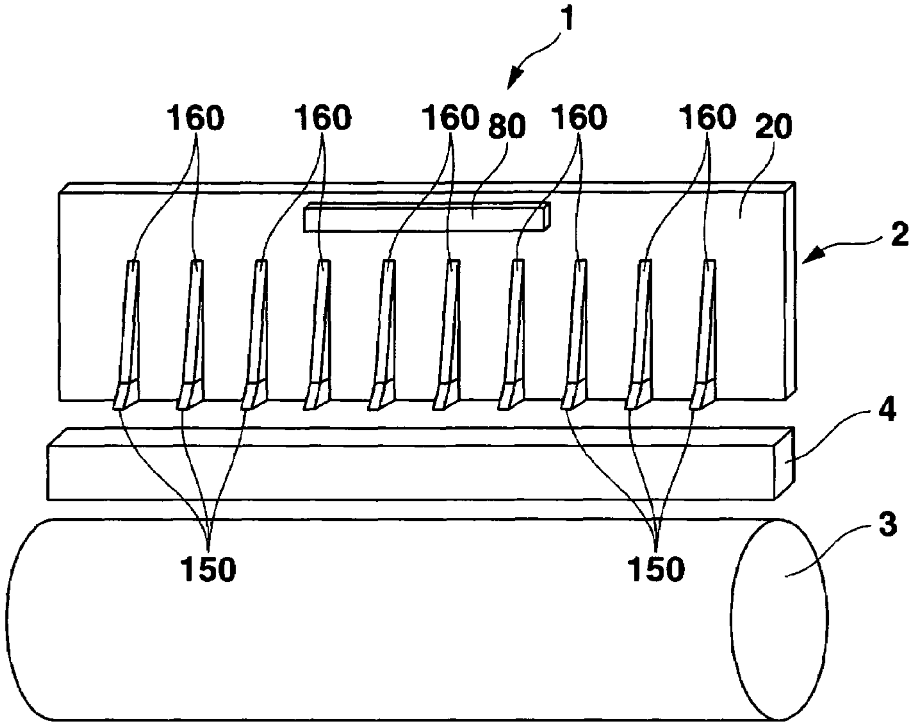
FIG. 19 is a perspective view of an image output apparatus 1.

FIG. 19 is a perspective view of an image output apparatus 1. As shown in FIG. 19, in the image output apparatus 1, a scanning head 2 having two or more light-emitting elements is placed with the light-emitting part opposed to a generating line of a photoconductive drum 3 and the longish side paralleled to the rotary shaft of the roller-shaped photoconductive drum 3. A SELFOC lens array 4 is provided between the light-emitting part of the scanning head 2 and the generating line of the photoconductive drum 3, with two or more CELFOC lenses arranged in a line or two or more lines along the light-emitting part of the scanning head 2, each of which takes a radial straight line of the photoconductive drum 3 as an optical axis. The light beam from the light-emitting part of the scanning head 2 is focused onto the generating line of the photoconductive drum 3 by the CELFOC lens.

Figure 20:
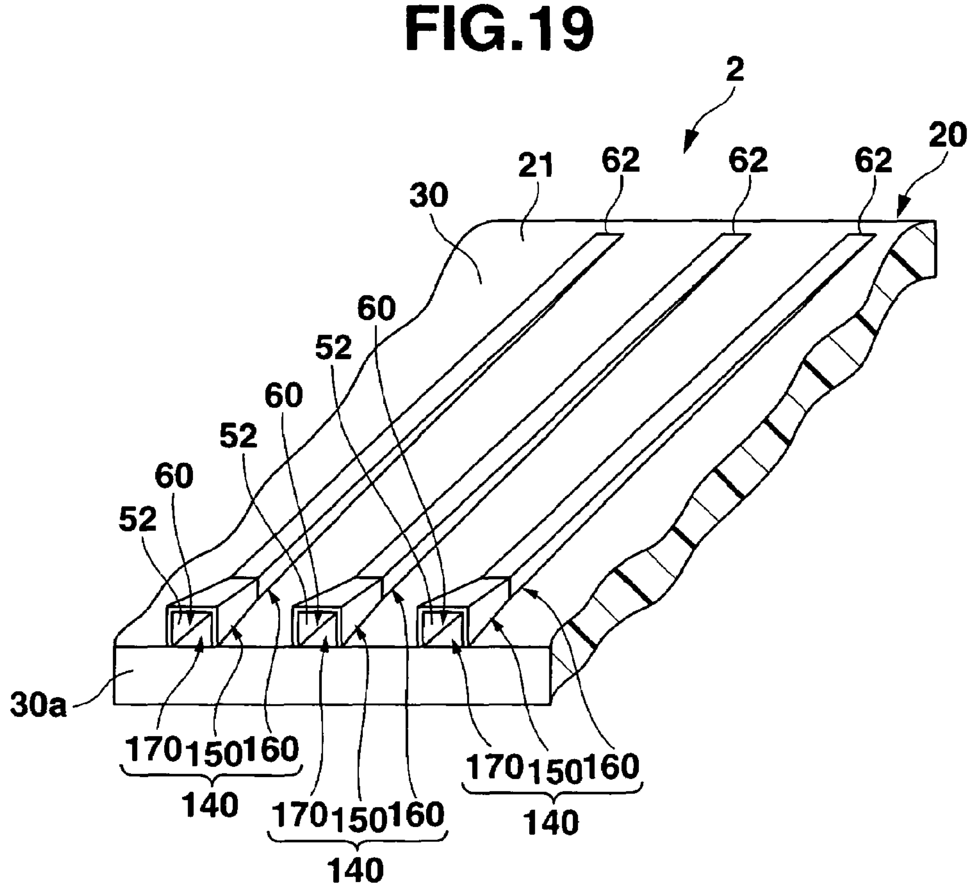
FIG. 20 is a perspective view showing the configuration of three dots of a scanning head.

FIG. 20 is a perspective view showing the configuration of three dots of the scanning head 2. The scanning head 2 has a surface emitting part array panel 20, and a plurality of light guide parts 60 aligned arranged on the emission plane 21 of the surface emitting part array panel 20.

Figure 21:
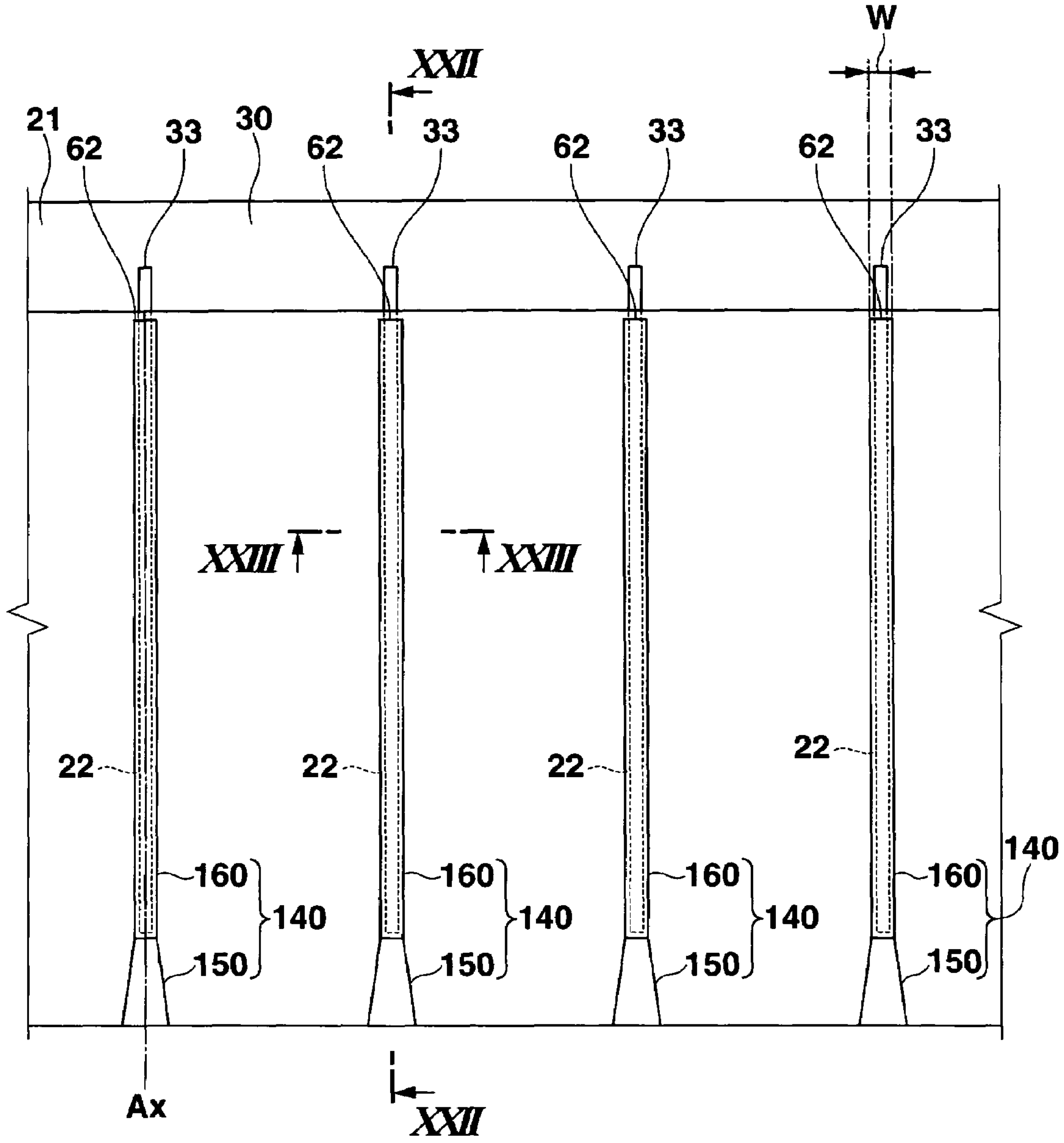
FIG. 21 is a plane view of an emitting plane of a surface emitting part array panel for four dots.
Figure 22:
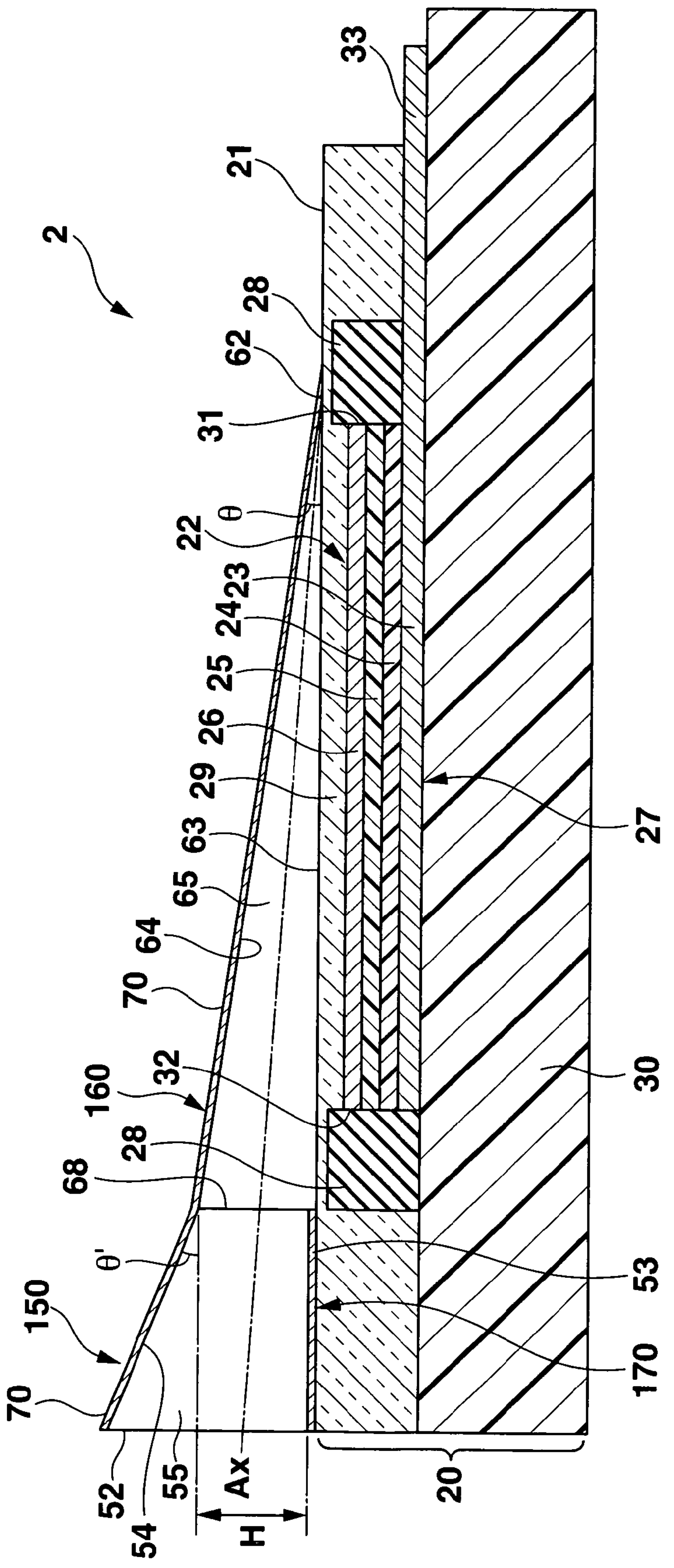
FIG. 22 is an arrow indicated cross section of the surface taken along lines XXII-XXII of FIG. 21.
Figure 23:
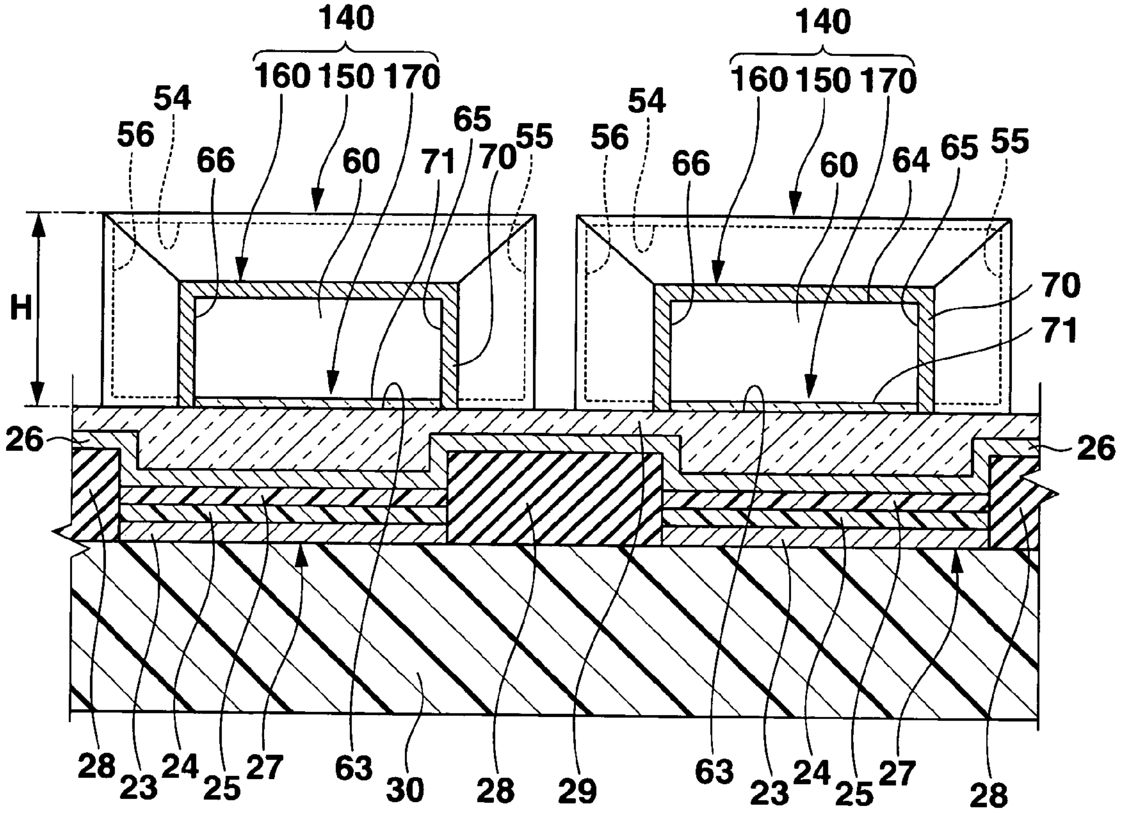
FIG. 23 is an arrow indicated cross section of the surface taken along lines XXIII-XXIII of FIG. 21.

FIG. 21 is a plane view of the emission plane 21 of the surface emitting part array panel 20. FIG. 22 is an arrow indicated cross section of the plane along the thickness of an insulating substrate 30, passing lines XXII-XXII of FIG. 21. FIG. 23 is an arrow indicated cross section of the plane along the thickness of an insulating substrate 30, passing lines XXIII-XXIII of FIG. 21.

As shown in FIGS. 21 to 23, the surface emitting part array panel 20 is composed of an insulating substrate 30 and a plurality of surface emitting parts 22 shaped like substantially a rectangle (quadrilateral) in a plane view, and aligned on the insulating substrate 30 to be placed underside of the light guide part 60.

Each of the surface emitting parts 22 has an organic electroluminescent element 27. Namely, the surface emitting part 22 has a light reflective lower electrode 23 formed on the insulating substrate 30, an organic EL layer stacked on the lower electrode 23, and a transparent upper electrode 26.

The organic electroluminescent layer has a positive hole carrying layer 24 and a light-emitting layer 25, for example, as shown in FIG. 22. The positive hole carrying layer 24 contains polythiophene (PEDOT) as a conductive high polymer, and polystyrene sulfonic acid (PSS) as dopants. The light-emitting layer 25 contains a conjugated double-bond polymer such as polyphenylene vinylene, for example. If the surface emitting part 22 emits light as an organic electroluminescent element 27, the organic electroluminescent layer between the lower electrode 23 and upper electrode 26 may not have the two-layer structure consisting of the positive hole carrying layer 24 and light-emitting layer 25. For example, the layer between the lower electrode 23 and upper electrode 26 may have a three-layer structure consisting of a positive hole carrying layer, a light-emitting layer and an electron carrying layer stacked sequentially on the lower electrode 23, or may have one-layer structure consisting of a light-emitting layer only, or may have a light-emitting layer and an electron carrying layer. It may also be a laminated structure having an electron or positive hole carrying layer interposed between appropriate layers in these layer structures, or may be another laminated structure. If the lower electrode 23 is used as a cathode and the upper electrode 26 is used as an anode, the lower electrode 23 shall have an electric charge carrying layer with an electron carrying property, and the upper electrode 26 shall have an electric charge carrying layer with a positive hole carrying property.

The lower electrode 23 preferably has a reflective property for the light of the organic electroluminescent layer, and is preferably made of material easy to carry positive holes for the positive hole carrying layer 24, containing metal such as aluminum, chromium or titanium, when used as an anode. The lower electrode 23 may be a layered product, which has such a reflective conductive layer as a lower layer, and has a transparent conductive layer containing at least one of tin doped indium oxide (ITO), zinc doped indium oxide, indium oxide ($In_2O_3$), tin oxide ($SnO_2$), zinc oxide (ZnO) and cadmium tin oxide ($CdSnO_4$), as an upper layer just like contacting the positive hole carrying layer 24.

The upper electrode 26 has a transmissible property for the light of the organic electroluminescent layer, and has an electron carrying film with a thickness of 1 to 20, preferably 5 to 12 nm, which is made of material with a work function lower than an anode made of a single substance or alloy containing at least one of indium, magnesium, calcium, lithium, barium and rare earth metal, and provided on the surface contacting a charge-carrying layer with an electron-carrying property, when used as a cathode; and a transparent conductive layer to decrease a sheet resistance as a cathode. The transparent conductive layer is a layered product, which contains at least one of tin doped indium oxide (ITO), zinc doped indium oxide, indium oxide ($In_2O_3$), tin oxide ($SnO_2$), zinc oxide (ZnO) and cadmium tin oxide ($CdSnO_4$). When used as an anode electrode, the upper electrode 26 contains at least one of tin doped indium oxide (ITO), zinc doped indium oxide, indium oxide ($In_2O_3$), tin oxide ($SnO_2$), zinc oxide (ZnO) and cadmium tin oxide ($CdSnO_4$), on the surface contacting a charge carrying layer with a positive hole carrying property, and has the thickness of preferably 30 to 200 nm.

Like the organic electroluminescent element 27 emits light independently at an appropriate timing, in the surface emitting part 22, at least one of the upper electrode 26 and lower electrode 23 is separately formed to be electrically insulated for each organic electroluminescent element 27. In this embodiment, the lower electrode is formed separately for each surface emitting part 22, and the upper electrode 26 is formed as a film evenly on the plane common to all surface emitting parts 22.

The positive pole carrying layer 24 may be separately formed for each surface emitting part 22, or may be formed as a film evenly on the plane common to every surface emitting part 22. It is also permitted to form the positive pole carrying layer 24 as a film on the plane common to all surface emitting parts 22, and form the light-emitting layer separately as a light-emitting layer to emit light of different color for each surface emitting part 22. In this embodiment, both positive hole carrying layer 24 and light-emitting layer 25 are separately formed for each surface emitting part 22.

In this embodiment, the lower electrode 23, positive hole carrying layer 24 and light-emitting layer 25 are separately formed for each surface emitting part 22. The lower electrode 23, positive hole carrying layer 24 and light-emitting layer 25 are parted by the insulating film 28 for each surface emitting part 22, and enclosed by the insulating film 28 in a plane view. The insulating film 28 is made of inorganic material such as silicon nitride and silicon dioxide, or photoconductive resin such as polyimide. The surface emitting part 22 emits light into the light-emitting layer 25. The surface of the insulating film 28 is preferably lightproof to prevent propagation of the light emitted in the light-emitting layer 25 of a certain surface emitting part 22 to the light-emitting layer 25 of the adjacent surface emitting part 22.

The insulating film 28 and upper electrode 26 are covered with a transparent sealing film 29 having a smooth surface. The lower electrode 23, positive hole carrying layer 24, light-emitting layer 25 and insulating film 28 are entirely sealed with the sealing film 29. Since the surface emitting part 22 is a top emission organic electroluminescent element, the surface of the sealing film 29 becomes an exit plane of the surface emitting part 22.

One light guide part 60 is opposite to one surface emitting part 22, and a dot radiation element is composed of one surface emitting part 22 and one opposite light guide part 60.

The light guide part 60 will be explained hereinafter. As shown in FIG. 19 to FIG. 23, the light guide part 60 is placed at the position corresponding to the surface emitting part 22, and enclosed by the sealing film 29 and a cylindrical light-reflecting part 140 having an opened entrance plane 63 to receive the light from the surface emitting part 22. The light-reflecting part 140 has a first reflecting part 160 which faces the surface emitting part 22 and has a light-reflective inside surface, a second reflecting part 150 which is connected to the first reflecting part 160 on the boundary plane 68 that becomes a light-emitting end face in the first reflecting part 160, and has a light-reflective inside surface, and a third reflecting part 170 which is placed under the second reflecting part 150, and has a light-reflective front surface. The first reflecting part 160 and second reflecting part 150 are formed by a continued reflection film 70. The third reflecting part 170 is separately formed by a reflection film 71. The reflection films 70 and 71 are both made of light-reflective metal or alloy, and preferably have a high reflectivity for the light from the organic electroluminescent element 27. There reflection films are preferably made of silver or aluminum if the main light-emitting wavelength range of the organic electroluminescent element 27 is over 400 nm, and gold if the wavelength range is over 600 nm.

The first reflecting part 160 is opened in the entrance plane 63 on the lower side corresponding to the surface emitting part 22 and boundary plane or the front side 68. The second reflecting part 150 is opened in the boundary plane 68, the exit plane or the front side 52 that becomes a light-emitting end face opposite to the boundary plane 68, and the lower side of the surface emitting part 22. The exit plane 52 is positioned on the same plane as the end face 30*a* of the insulating substrate 30. The third reflecting part 170 is formed like a plane and placed under the opened lower side of the second reflecting part 150.

The first side reflection planes 65 and 66 arranged parallel in the first reflecting part 160 are triangles with the height decreased from the front to the rear, and the space enclosed by the first reflecting part 160 and the sealing film 29 forms a triangular prism. In the second reflecting part 150 and third reflecting part 170, the boundary plane 68 and the exit plane 52 faced and opened are similar quadrilaterals of different sizes, and the space enclosed by the second reflecting part 150 and third reflecting part 170 forms a square pyramid.

The light guide part 60 is provided with the entrance plane 63, the exit plane 52, the first opposite reflection plane 64 opposite to the entrance plane 63, the first side reflection planes 65 and 66 between the peripheral edges of the entrance plane 63 and first opposite reflection plane 64, the second reflection plane 53 on the plane (the top of the sealing film 29) of the extension to the front of the entrance plane 63, and the first opposite reflection plane 64. The light guide part 60 has also a second opposite reflection plane 54 continuing to the first opposite reflection plane 64, opposite to the second reflection plane 53 in the state inclined to the second reflection plane 53, and second side reflection planes 55 and 56 between the peripheral edges of the second reflection plane 53 and second opposite reflection plane 54.

The reflection film 70 in the first reflecting part 160 contacts the light-reflective first opposite reflection plane 64, and the light-reflective first side reflection planes 65 and 66 between the peripheral edges of the entrance plane 63 and first opposite reflection plane 64.

The reflection film 71 of the third reflecting part 170 formed on the front portion of the sealing film 29 contacts the second reflection plane 53 having the light-reflective surface.

The reflection film 70 of the second reflecting part 150 is opposite to the second reflection plane 53 of the third reflecting part 170, and provided continuously along the first opposite reflection plane 64, and adjacent to the light-reflecting second opposite reflection plane 54 and the second side reflection planes 55 and 56 between the peripheral edges of the second reflection plane 53 and second opposite reflection plane 54, in the state inclined to the second reflection plane 53.

The light emitted from the surface emitting part 22 into the light guide part 60 in the light reflecting part 140 is set to be reflected in the light reflecting part 140 and then outputted from the exit plane 52, or outputted directly from the exit plane 52.

The lower electrode 23 has also a function as a reflection plane to reflect the light entered directly and the light reflected on the first opposite reflection plane 64 and first side reflection planes 65 and 66, among the light emitted from the light-emitting layer 25.

The above mentioned entrance plane 63 is relatively inclined to the first opposite reflection plane 64. The entrance plane 63 is set substantially rectangular to the boundary plane 68 between the first reflecting part 160 and second reflecting part 150 (the surface opposite to the included angle between the entrance plane 63 and first opposite reflection plane 64). The first side reflection planes 65 and 66 are originally rectangular to the entrance plane 63, and the side contacting the first opposite reflection plane 64 is substantially wedge-shaped with a fixed elevation angle θ (θ>0°) from the end portion 62 to the boundary plane. Therefore, the sectional area of plane cut parallel to the boundary plane 68 is gradually increased from the end portion 62 to the boundary plane 68, or as approaching the boundary plane 68.

In the entrance plane 63 and first opposite reflection plane 64, the width W of the light guide part 60 is substantially equal from the end portion 62 to the boundary plane 68. The entrance plane 63 and first opposite reflection plane 64 are rectangles (quadrilaterals) becoming long from the end portion 62 to the boundary plane 68. The area of the entrance plane 63 is larger than the area of the boundary plane 68. For example, the entrance plane 63 is a rectangle of 300 μm×10 μm, and the area is 3000 $\mu m^2$. The boundary plane 68 is a rectangle of 10 μm×5 μm, and the area is 50 $\mu m^2$.

In the first side reflection planes 65 and 66, the height H of the light guide part 60 is gradually increased in the part from the end portion 62 to the boundary plane 68, or as approaching the boundary plane 68.

The exit plane 52 and second reflection plane 53 are both inclined to the second opposite reflection plane 54. The exit plane 52 is a plane opposite to the end portion 62, or the included angle portion between the first opposite reflection plane 64 and entrance plane 63. In the exit plane 52, the included angle to the second reflection plane 53 is substantially a right angle.

The second side reflection planes 55 and 56 are both orthogonal to the second reflection plane 53, and the side contacting the second opposite reflection plane 54 is substantially wedge-shaped with a fixed second elevation angle θ' (θ'>θ), from the boundary plane to the exit plane 52, and the sectional area of the plane cut parallel to the exit plane 52 is gradually increased from the boundary plane 68 to the exit plane 52, or as approaching the exit plane 52. The area of the entrance plane 63 is larger than the area of the exit plane 52. Concretely, the exit plane 52 is a rectangle of 20 μm×10 μm, and its area is 200 $\mu m^2$.

The second elevation angle θ' is larger than the first elevation angle θ, and the first opposite reflection plane 64 and second opposite reflection plane 54 are formed to be a valley in the boundary plane 68.

The width W of the second reflection plane 53 and second opposite reflection plane 54 is gradually increased from the boundary plane 68 to the exit plane 52. The height H of the second side reflection planes 55 and 56 is gradually increased from the boundary plane 68 to the exit plane 52.

The reflection film 70 is preferably continued to the first reflecting part 160 and second reflecting part 150, but may be separated in the boundary plane 68. The shape of the first opposite reflection plane 64 and the shape of the reflection film 70 in the first reflecting part 160 contacting the first reflection plane 64 are substantially rectangular in a plane view, as shown in FIG. 21. The shapes of the first side reflection planes 65 and 66 and the shape of the reflection film 70 in the first reflecting part 160 contacting the first side reflection planes 65 and 66 are triangular, as shown in FIG. 22. The shape of the second opposite reflection plane 54 and the shape of the reflection film 70 in the second reflecting part 150 contacting the second opposite reflection plane 54 are trapezoidal, as shown in FIG. 21. The shapes of the second side reflection planes 55 and 56 and the shape of the reflection film 70 in the second reflecting part 150 contacting the second side reflections planes 55 and 56 are trapezoidal, as shown in FIG. 22. The shape of the second reflection plane 53 and the shape of the reflection film 71 in the third reflection part 170 contacting the second reflection plane 53 are trapezoidal.

The exit plane of the surface emitting part 22 is shaped similar to the entrance plane 63 with substantially the same dimensions as shown in FIG. 21, and emits a light beam like a rectangle cross section that becomes long from one end 31 to the other end 32. The area of the exit plane of the surface emitting part 22 is 80-110%, preferably 85-99% of the area of the entrance plane 63 of the light guide part 60. For the emission of rectangular light beam of the surface emitting part 22, one of the upper and lower electrodes 26 and 23 formed electrically independent of each surface emitting part 22, i.e. the lower electrode 23 in this embodiment is rectangular. In the surface emitting part 22, the whole plane preferably overlaps only the corresponding entrance plane 63 to prevent emission of light to the light guide part 60 corresponding to the adjacent surface emitting part 22.

The entrance plane 63 contacts just like facing the exit plane of the surface emitting part 22, the entrance plane 63 overlaps the emission form area of the surface emitting part 22, the end portion 62 is placed close to the peripheral edge of one end 31 of the surface emitting part 22, and the boundary plane 68 is parallel to the bottom side of the other end 32 of the surface emitting part 22. The principal axis direction from one end 31 of the surface emitting plane 22 to the other end 32 is identical to the direction of the principal axis Ax of the light guide part 60 viewed from the normal of the surface emitting part 22, as shown in FIG. 21.

The reflection film 70 of the light reflecting part 140 defining the shape of the light guide part 60 can be molded three-dimensionally by pouring reflective material that becomes a reflective film 70, into a three-dimensional mold controlled in depth by changing the acceleration voltage, when exposing an electro beam.

As shown in FIG. 19, the exit plane 52 of the light guide part 60 is opposite to the entrance plane of the SELFOC lens array 4, so that the exit plane 52 of each light guide part 60 becomes a light-emitting part of the scanning head 2, and the principal axis Ax of the light guide part 60 coincides with the optical axis of the CELFOC lens array 4.

A driving circuit 80 is provided on one side of the surface emitting part array panel 20, a wiring 33 of the surface emitting part 22 is connected to the driving circuit 80. The driving circuit 80 applies desired voltage or current to the organic electroluminescent element 27 through the wiring 33, based on the image signal that becomes a printing data, and causes the organic electroluminescent element 27 to emit light appropriately.

As the shape of the light-emitting layer 25 of the part overlapping the lower electrode 23 and upper electrode 26 is rectangular, the surface emitting part 22 emits a light beam like a rectangle. The light emitted from the surface emitting part 22 enters the entrance plane 63 of the light guide part 60. The entered light is propagated in the first reflecting part 160 while repeating reflection on the entrance plane 63, first opposite reflection plane 64 and first side reflection planes 65, 66, according to the first elevation angle θ. The light is further reflected on the second reflection plane 53, second opposite reflection plane 54 and second side reflection planes 55, 56, according to the second elevation angle θ', and while repeating reflection, the light is given directivity to advance to the exit plane 52, and propagated in the light guide part 60, and output from the exit plane 52 of the light guide 60 substantially along the principal axis Ax of the light guide part 60. In this way, the light guide part 60 itself functions as a light adjusting part to adjust the directivity of incident light. Therefore, the light entering the entrance plane 63 of the light guide part 60 is efficiently emitted from the exit plane 52, and the directivity in the vertical direction to the exit plane 52 is improved. The light beam emitted from the exit plane 52 is focused on the generating line of the photoconductive drum 3 rotated by the CELFOC lens array 4, and an image is formed on the side of the photoconductive drum 3.

EMBODIMENT 3

Figure 24:
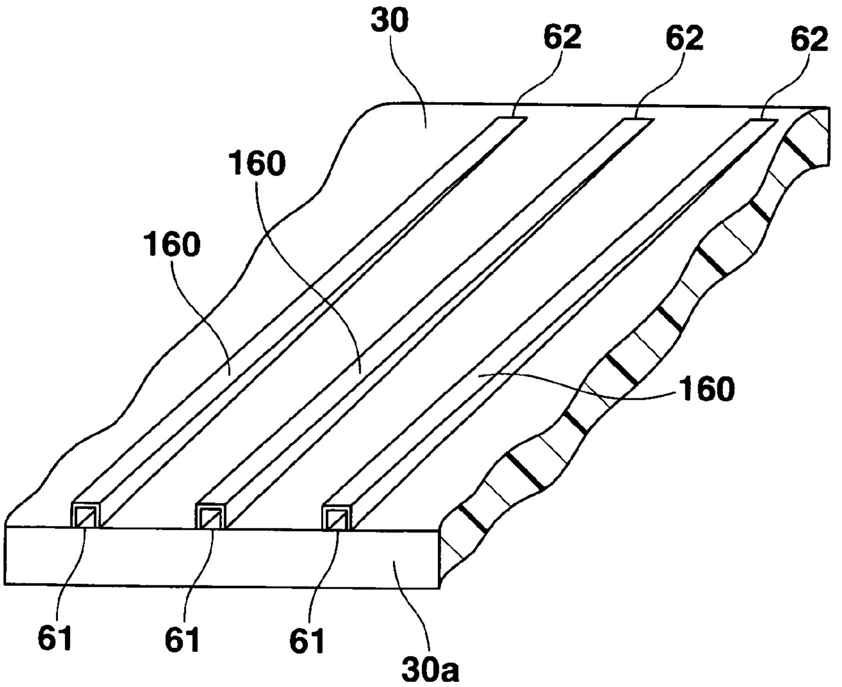
FIG. 24 is a perspective view showing the configuration of three dots of a scanning head in a comparing example.

The amount of light from an exit plane of a triangular prism shape light guide part with a triangular side defined only by the first reflecting part 160 is compared with that of the light guide part 60 (an example of the present invention) defined by the first reflecting part 160, second reflecting part 150 and third reflecting part 170 (a comparing example), as shown in FIG. 24. The surface emitting part 22 is set to the same or similar shape and size in either the comparing example or the example of the present invention, and the first reflecting part 160 is also set to the same or similar shape and size in either the comparing example or the example of the present invention. But, in the comparing example, the boundary plane 68 that is the light-emitting end face of the first reflecting part 160 is set to the substantially same level as the end face **30*a*** of the insulating substrate.

The light guide part 60 in the first reflecting part 160 is set to 300 μm in length, 10 μm in width, and 5 μm in height on the boundary plane 68. The light guide part 60 in the second reflecting part 150 and third reflecting part 170 is set to 40 μm in length, 10 μm in width on the boundary plane 68, 20 μm in width on the exit plane 52, 5 μm in height on the boundary plane 68, and 10 μm in height on the exit plane 52.

Difference in the amount of light emitted within an angle of 25° to the principal axis Ax of the light guide part 60 is compared in a relative value, assuming that the first reflecting part 160 and second reflecting part 150 are filled with air (refractivity 1.00), and the emission flux density per area of 1 $\mu m^2$ of the surface emitting part 22 is "1".

In the light emitted from the exit plane, the amount of light emitted within an angle of 25° to the principal axis Ax is "131" in the comparing example, and "420" in the example of the invention. Therefore, the amount of light emitted within an angle of 25° can be increased to approximately 3.2 times of a conventional value.

According to the embodiment of the invention, the light emitted from the surface emitting part 22 enters the entrance plane 63 of the light guide part 60, advances in the light guide part 60 along its longitudinal direction or an axis Ax, and goes out from the exit plane 52. The second opposite reflection plane 54 is provided in the state inclined to the second reflection plane 53 to have a second included angle θ' larger than the first included angle θ between the first opposite reflection plane 64 and entrance plane 63. This can improve the directivity of light in the vertical direction to the exit plane 52, and increase the amount of emitted light without reducing the life of the element. As a result, a crosstalk between adjacent pixels can be prevented.

Since the area of the exit plane 52 is smaller than the area of the entrance plane 63, the light applied from the surface emitting part 22 to the entrance plane 63 is output from the exit plane 52 in the converged state. Thus, even if the emission intensity per unit area of the surface emitting part 22 is low, light is output from the exit plane 52 with high intensity. Therefore, the photoconductive drum 3 is exposed in a short exposing time, and can be rotated at high speed, so that the printing time can be reduced.

It can be considered to increase the emission intensity of the surface emitting part 22 in order to increase the intensity of the light emitted from the exit plane 52. But, the increased emission intensity of the surface emitting part 22 will reduce the life of the surface emitting part 22. Since the light applied from the surface emitting part 22 to the entrance plane 63 is output from the exit plane 52 in the converged state, it is also possible to increase the intensity of the light from the exit plane 52 by increasing the light-emitting area of the surface emitting part 22. If the light-emitting area of the surface emitting part 22 is increased, the light intensity on the exit plane 52 is increased by increasing the area of the entrance plane 63 to meet the increased light-emitting area, without increasing the area of the exit plane 52. Therefore, an image can be formed with high resolution without increasing the diameter of a dot.

Since the shape of the light guide part 60 is set so that the light applied into the light guide part 60 can easily advance to the exit plane 52, the light beam taken in from the entrance plane 63 can be efficiently emitted. Further, since directivity is given to increase the light intensity in the principal axis Ax of the light guide part 60, light can be efficiently applied to the CELFOCS lens array 4, and the light use efficiency is increased. Therefore, the photoconductive drum 3 is exposed in a short exposing time, and can be rotated at high speed. As a result, the printing time can be reduced.

The present invention is not limited to the embodiment described above. The invention may be modified and changed in design without departing from its spirit or essential characteristics.

For example, the light guide part 60 parted by the reflection films 70 and 71 is filled with gaseous matter having transmissivity such as air. The light guide part is not limited to this. It may be made of transparent solid material with a low refractivity, for example, fluorine based resin composed of polymers such as polydimethylsiloxane resin, ethylene fluoride and propylene fluoride, epoxy based thermosetting resin and glass, or transparent liquid material with a low refractivity, for example, water (refractivity $n_D^{20}$=1.33), methyl alcohol (refractivity $n_D^{20}$=1.32), or ethyl alcohol (refractivity $n_D^{20}$=1.36). In case of using liquid material, it is necessary to seal the liquid body sufficiently with another transparent member, to prevent leakage from the exit plane 52. In the case of using solid material, the light guide part may be formed by flowing solution of solid material into a mold of resist pattern processed minutely to a nano-size and solidifying it, by using nano-inprint technology. The refractivity is preferably as close to 1 of air as possible, and preferably 1.5 or less as a resin. A reflection plane may be formed by forming a reflective film at a specified portion of a light guide part.

Figure 25:
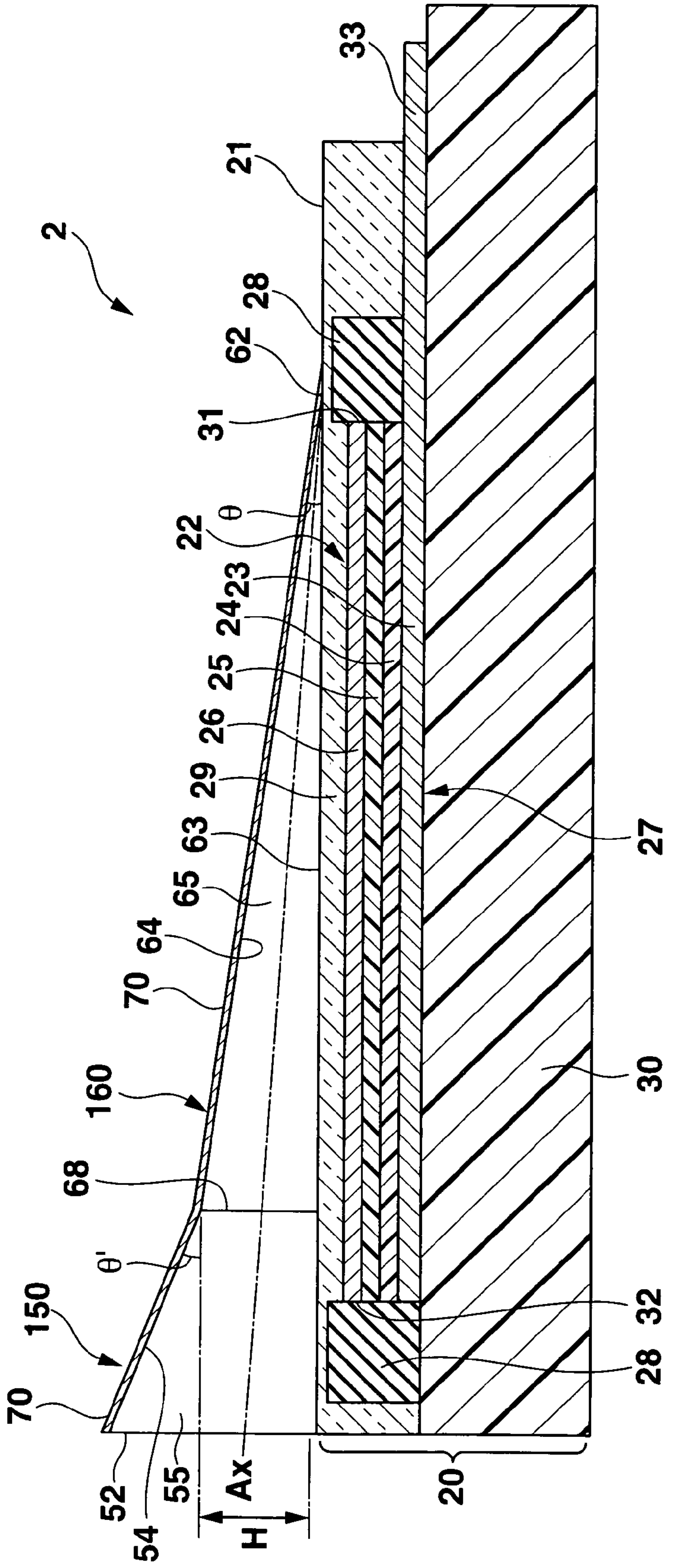
FIG. 25 is a sectional view of a scanning head cut in the direction of a principal axis.

In the above embodiment, the second reflecting part 150 may be formed, for example, as shown in FIG. 25, by forming the surface emitting part 22 on the insulating substrate 30 up to the lower side of the second reflecting part 150, without providing the reflection film 71, and making the light-reflecting lower electrode 23 of the organic electroluminescent element 27 as a third reflecting part 170.

Figure 26:
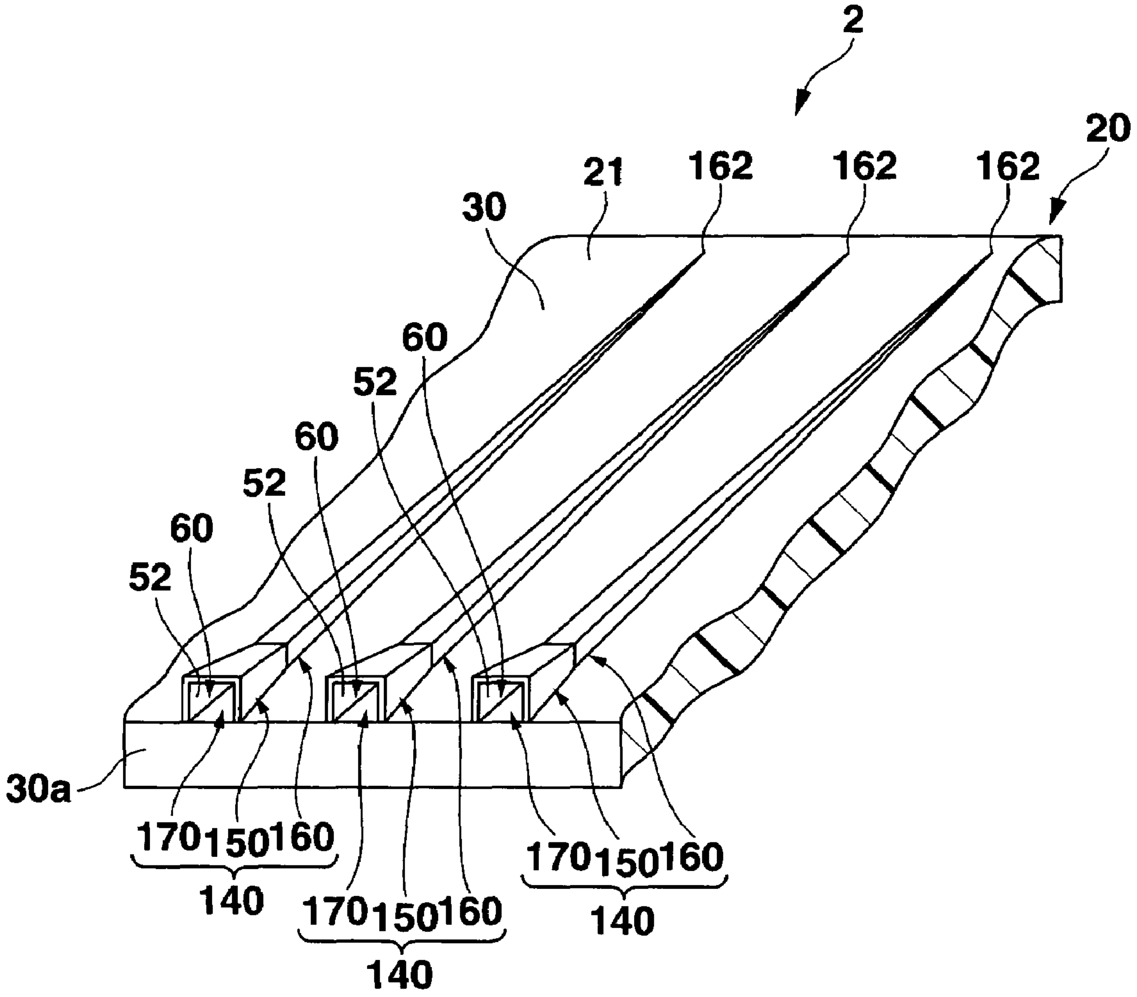
FIG. 26 is a perspective view showing the configuration of three dots of a scanning head.
Figure 27:
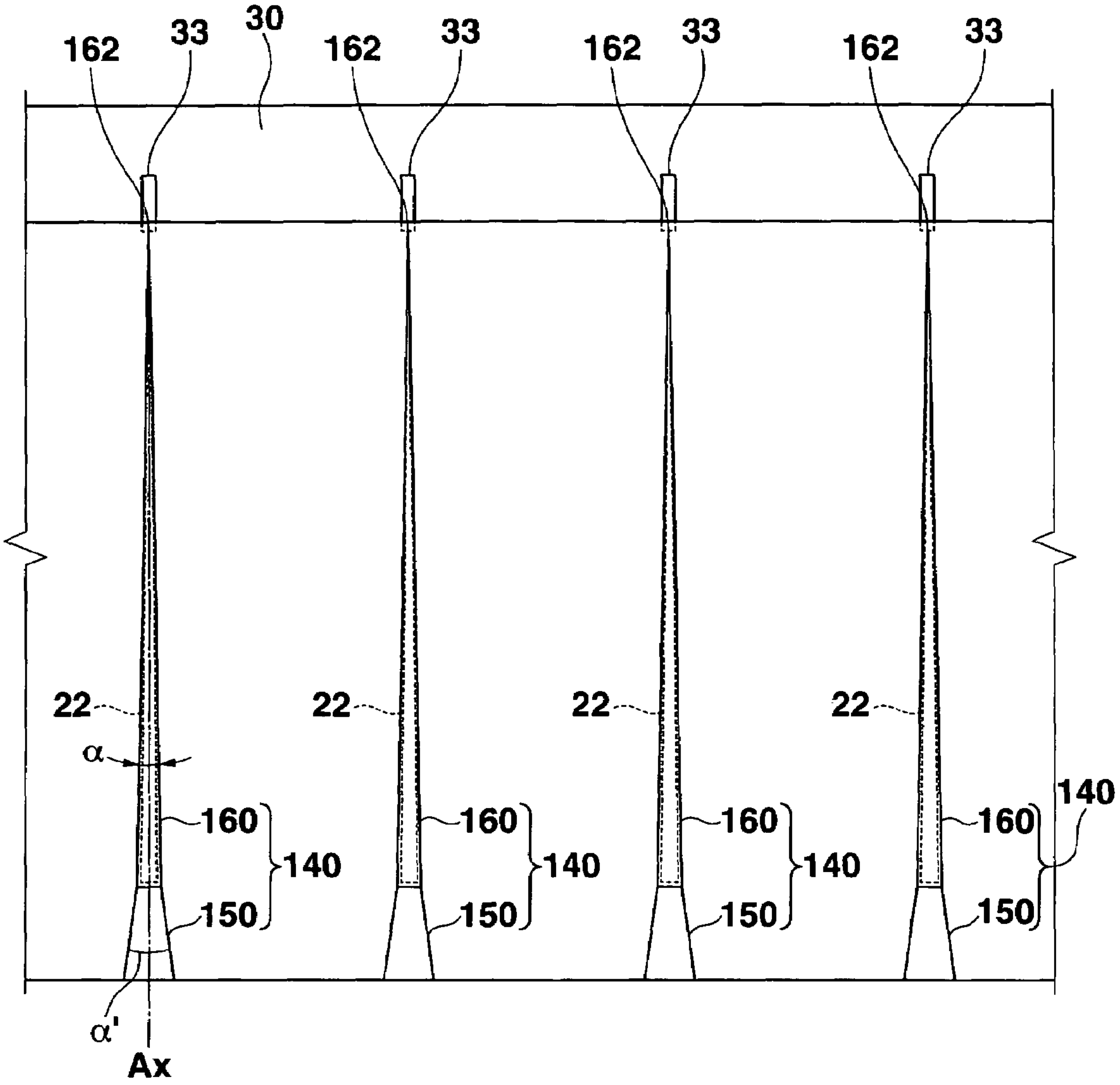
FIG. 27 is a plane view of an emitting plane of a surface emitting part array panel for four dots.

In the above embodiment, the surface emitting part 22 (the light-emitting layer 25 of the part overlapping the lower electrode 23 and upper electrode 26), the entrance plane 63 and first opposite reflection plane 64 of the light guide part 60, and the first reflecting part 160 contacting the first opposite reflection plane 64 are rectangular, but they may be shaped as a triangle as shown in FIGS. 26 and 27. Namely, the light guide part 60 in the first reflecting part 160 may be formed as a square pyramid having the boundary plane 68 as a bottom in order to increase the emission efficiency. Even in this case, θ'>θ. The angle α of the end portion 162 in the first reflecting part 160 and angle α' corresponding to the second opposite reflection plane 54 in the second reflecting part 150 are set to α<α'. These shapes may be realized by forming an insulating film to cover the peripheral edge of the lower electrode 23 and forming a triangular opening to expose the lower electrode 23 in the insulating film.

Figure 28:
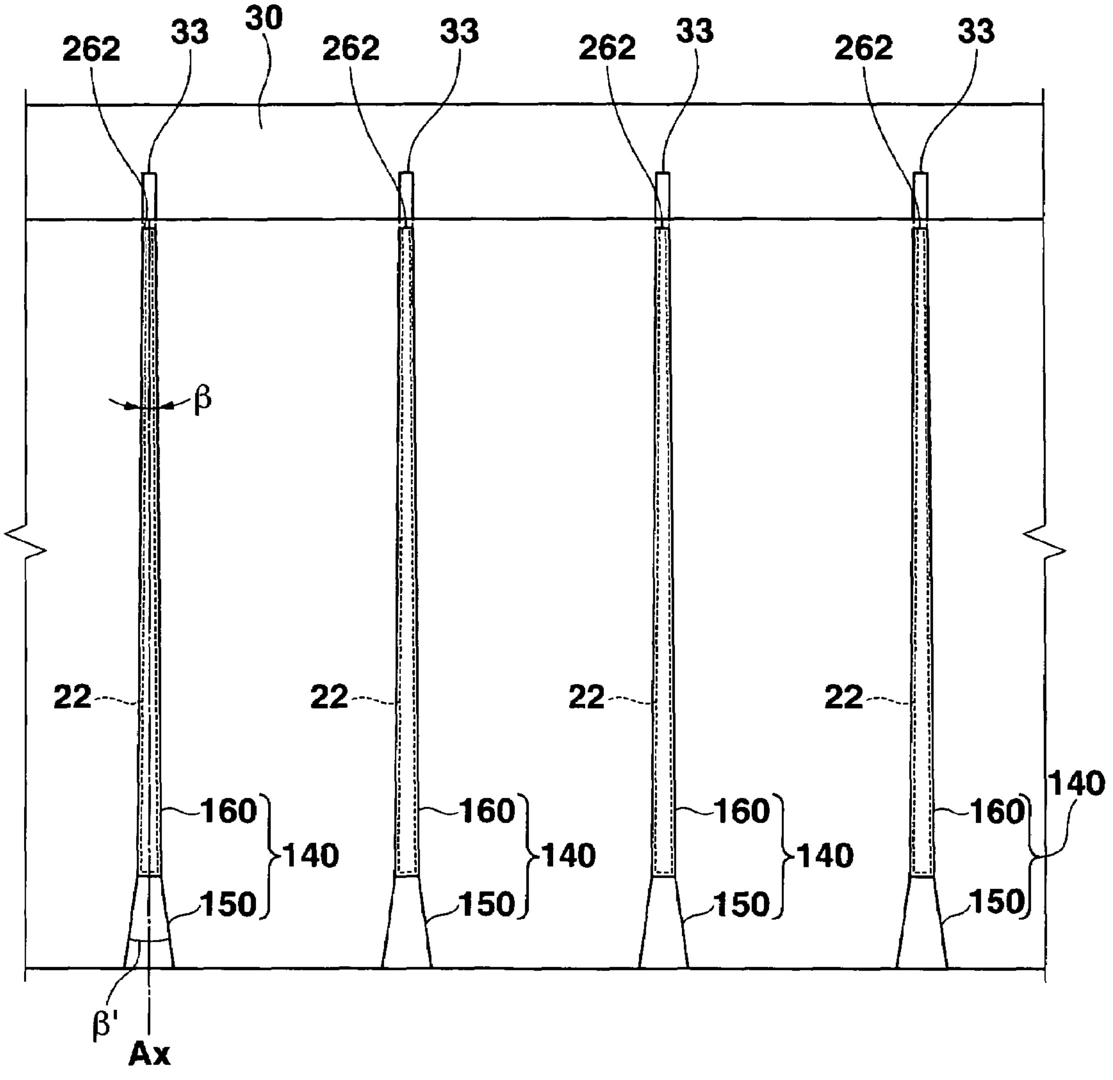
FIG. 28 is a plane view of an emitting plane of a surface emitting part array panel for four dots.

The surface emitting part 22 (the light-emitting layer 25 of the part overlapping the lower electrode 23 and upper electrode 26), the entrance plane 63 and first opposite reflection plane 64 of the light guide part 60, and the first reflecting part 160 contacting the first opposite reflection plane 64 may be trapezoidal as shown in FIG. 28. Even in this case, θ'>θ. The angle β of the end portion 262 in the first reflecting part 160 and angle β' corresponding to the second opposite reflection plane 54 in the second reflecting part 150 are set to β<β'. These shapes may be realized by forming an insulating film to cover the peripheral edge of the lower electrode 23 and forming a triangular opening to expose the lower electrode 23 in the insulating film.

If consistency is ensured, the configurations of these modifications may be appropriately combined.

Figure 29:
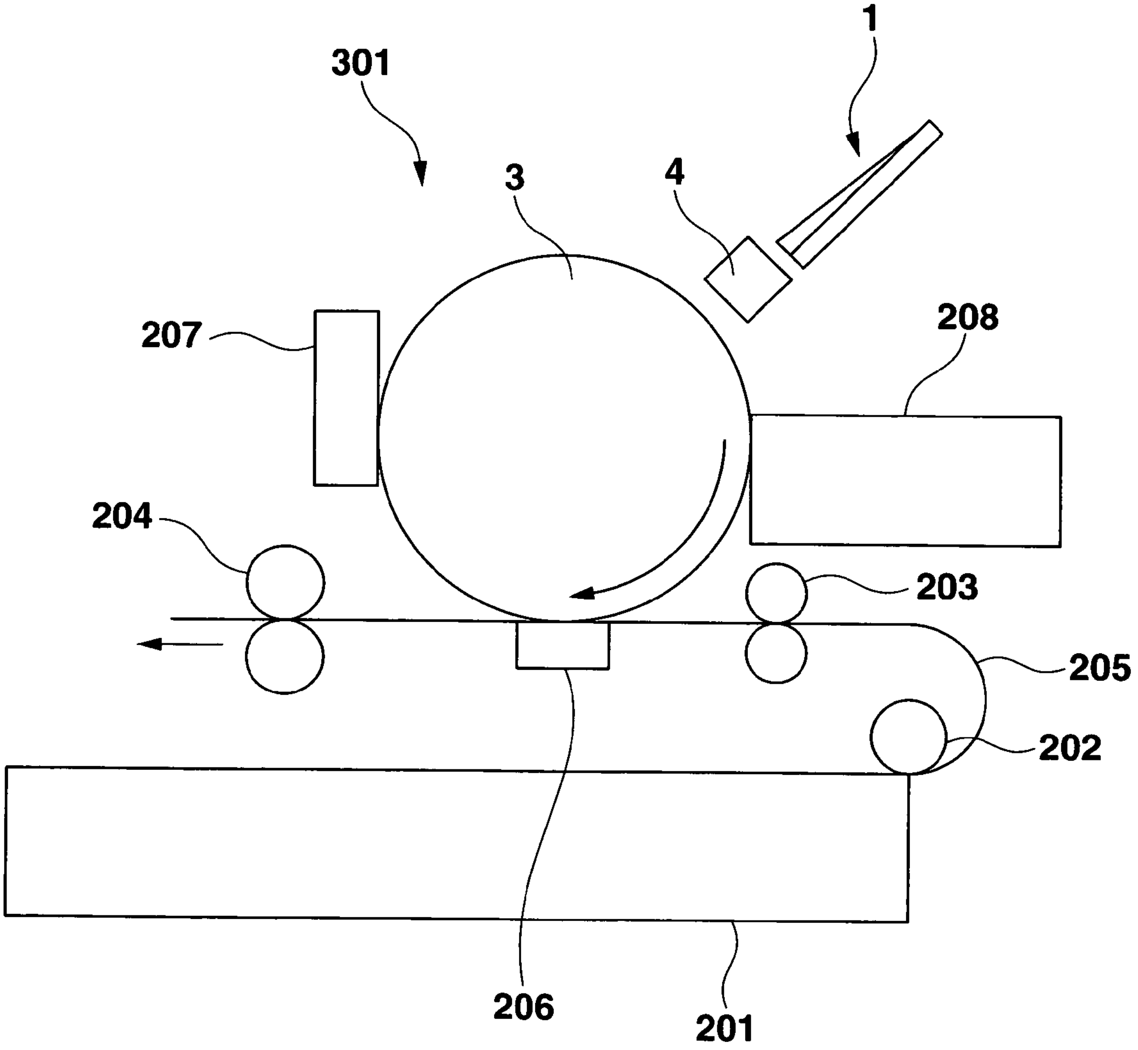
FIG. 29 is a conceptual illustration of a printer using the scanning head shown in any one of FIGS. 1 to 28.

The image output apparatus 1 of the embodiments described above can be applied to a printer used in a copier. As shown in FIG. 29, in addition to the scanning head 2, photoconductive drum 3 and CELFOCS lens array 4 of the image output apparatus 1, an electrophotographic printer 301 has a paper feed cassette 201 containing paper sheets 205 as a printing recording medium, a paper feed roller 202 to feed the paper sheets 205 one by one from the paper feed cassette 201, a developer 208 to develop an electrostatic latent image formed on the peripheral surface of the photoconductive drum 3 to a toner image, a pair of standby rollers 203 to adjust the timing of feeding the paper sheets 205 to a toner image formed on the photoconductive drum 3, a transfer unit 206 to transfer a toner image to a paper sheet, a fixing roller 204 to thermally fix the toner image transferred from the photoconductive drum 3 to a paper sheet in the transfer unit 206 to a paper sheet, and a cleaner 207 to remove toner remained on the photoconductive drum 3.

An image data stored in a frame memory is converted to an analog signal of corresponding tone by a digital to analog converter, and amplified to a fixed potential by an operational amplifier, and sent to a shift register in the driving circuit 80. In the driving circuit 80, the image data is sequentially transferred in the shift register, interlocking with the output of a clock signal. When image data for one line is stored in the analog shift register, the data is transferred to a latch circuit. The data transferred to the latch circuit is taken in an emission luminance control circuit based on a synchronizing signal with fixed timing, and modulated to current data or voltage data to cause the organic electroluminescent element 27 to emit light with the luminance corresponding to the data, and output to the organic electroluminescent element 27.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A scanning head comprising:

a surface emitting part array panel which comprises an array of surface emitting parts to emit light; and a plurality of light guide parts which are positioned opposite to the surface emitting parts, respectively, each of the light guide parts including: (i) an entrance plane to receive the light from the surface emitting part opposite to the light guide part, (ii) at least one reflection plane to reflect the light received through the entrance plane, and (iii) an exit plane to emit the light reflected by the reflection plane;

wherein each of the surface emitting parts comprises an organic electroluminescent element which is opposite to the entrance plane of one of the light guide parts.

2. The scanning head according to claim 1, wherein the at least one reflection plane of each of the light guide parts comprises a pair of reflection planes positioned opposite to each other, each of the light guide parts comprises a light adjusting part which is positioned between the opposite reflection planes and which has a width extending between the opposite reflection planes, and the width of the light adjusting part gradually increases toward the exit plane.

3. The scanning head according to claim 1, wherein the at least one reflection plane of each of the light guide parts comprises an opposite reflection plane positioned opposite to the entrance plane, each of the light guide parts comprises a light adjusting part which is positioned between the entrance plane and the opposite reflection plane and which has a height extending between the entrance plane and the opposite reflection plane, and the height of the light adjusting part gradually increases toward the exit plane.

4. The scanning head according to claim 1, wherein each of the surface emitting parts expands in width toward the exit plane.

5. The scanning head according to claim 1, wherein the at least one reflection plane comprises a plurality of reflection planes.

6. The scanning head according to claim 1, wherein the exit plane has a convex surface.

7. The scanning head according to claim 1, wherein the light guide part has a hollow body.

8. The scanning head according to claim 1, further comprising a substrate for supporting the organic electroluminescent elements, wherein each of the organic electroluminescent elements comprises a lower electrode, an organic electroluminescent layer and an upper electrode, and the entrance plane of each of the light guide parts is opposite to the upper electrode of one of the electroluminescent elements.

9. The scanning head according to claim 1, wherein an area of the exit plane is smaller than an area of the entrance plane.

10. A printer comprising:

(i) a scanning head which comprises:

a surface emitting part array panel which comprises an array of surface emitting parts to emit light; and a plurality of light guide parts which are positioned opposite to the surface emitting parts, respectively, each of the light guide parts including: (i) an entrance plane to receive the light from the surface emitting part opposite to the light guide part, (ii) at least one reflection plane to reflect the light received through the entrance plane, and (iii) an exit plane to emit the light reflected by the reflection plane; and (ii) a photoconductive drum to which the light from the exit planes is emitted.

11. The printer according to claim 10, wherein the at least one reflection plane of each of the light guide parts comprises a pair of reflection planes positioned opposite to each other, each of the light guide parts comprises a light adjusting part which is positioned between the opposite reflection planes and which has a width extending between the opposite reflection planes, and the width of the light adjusting part gradually increases toward the exit plane.

12. The printer according to claim 10, wherein the at least one reflection plane of each of the light guide parts comprises an opposite reflection plane positioned opposite to the entrance plane, each of the light guide parts comprises a light adjusting part which is positioned between the entrance plane and the opposite reflection plane and which has a height extending between the entrance plane and the opposite reflection plane, and height of the light adjusting part gradually increases toward the exit plane.

13. The printer according to claim 10, wherein each of the surface emitting parts expands in width toward the exit plane.

14. The printer according to claim 10, wherein the exit plane has a projected surface.

15. The printer according to claim 10, wherein each of the light guide parts has a hollow body.

16. The printer according to claim 10, wherein the exit plane has an area that is smaller than an area of the entrance plane.

17. The scanning head according to claim 1, wherein the at least one reflection plane of each of the light guide parts comprises an opposite reflection plane positioned opposite to the entrance plane.

18. The scanning head according to claim 17, wherein each of the light guide parts comprises a light adjusting part which is positioned between the entrance plane and the opposite reflection plane.

19. The printer according to claim 10, wherein the at least one reflection plane of each of the light guide parts comprises an opposite reflection plane positioned opposite to the entrance plane.

20. The printer according to claim 19, wherein each of the light guide parts comprises a light adjusting part which is positioned between the entrance plane and the opposite reflection plane.

* * * * *